(12) United States Patent
Sajima et al.

(10) Patent No.: US 9,283,441 B2
(45) Date of Patent: Mar. 15, 2016

(54) GOLF BALL

(75) Inventors: Takahiro Sajima, Kobe (JP); Hirotaka Nakamura, Kobe (JP)

(73) Assignee: SRI SPORTS LIMITED, Kobe-Shi (JP)

( * ) Notice: Subject to any disclaimer, the term of this patent is extended or adjusted under 35 U.S.C. 154(b) by 692 days.

(21) Appl. No.: 13/456,278

(22) Filed: Apr. 26, 2012

(65) Prior Publication Data

US 2013/0005507 A1 Jan. 3, 2013

(30) Foreign Application Priority Data

Jun. 30, 2011 (JP) .................. 2011-145379

(51) Int. Cl.
| | |
|---|---|
| *A63B 37/06* | (2006.01) |
| *A63B 37/00* | (2006.01) |
| *C08K 5/09* | (2006.01) |
| *C08K 5/14* | (2006.01) |

(52) U.S. Cl.
CPC ......... *A63B 37/0092* (2013.01); *A63B 37/0003* (2013.01); *A63B 37/0051* (2013.01); *A63B 37/008* (2013.01); *A63B 37/0032* (2013.01); *A63B 37/0033* (2013.01); *A63B 37/0044* (2013.01); *A63B 37/0045* (2013.01); *A63B 37/0062* (2013.01); *A63B 37/0063* (2013.01); *A63B 37/0075* (2013.01); *A63B 37/0076* (2013.01); *A63B 37/0083* (2013.01); *A63B 37/06* (2013.01); *C08K 5/09* (2013.01); *C08K 5/14* (2013.01)

(58) Field of Classification Search
CPC .................. A63B 37/0062; A63B 37/0063
USPC ........................................... 473/377
See application file for complete search history.

(56) References Cited

U.S. PATENT DOCUMENTS

| | | | | |
|---|---|---|---|---|
| 5,033,748 | A * | 7/1991 | Ebisuno ................. | 473/372 |
| 5,403,010 | A | 4/1995 | Yabuki et al. | |
| 6,702,694 | B1 * | 3/2004 | Watanabe .............. | 473/371 |
| 7,294,068 | B2 * | 11/2007 | Higuchi et al. ........ | 473/376 |
| 7,344,455 | B1 | 3/2008 | Higuchi | |
| 2003/0216193 | A1 * | 11/2003 | Graves .............. | A63B 45/00 473/351 |
| 2005/0170910 | A1 | 8/2005 | Hayashi | |
| 2006/0135287 | A1 | 6/2006 | Kennedy, III et al. | |
| 2007/0173607 | A1 | 7/2007 | Kennedy, III et al. | |

(Continued)

FOREIGN PATENT DOCUMENTS

| | | |
|---|---|---|
| JP | 61-37178 A | 2/1986 |
| JP | 2005-218858 A | 8/2005 |
| JP | 2006-230661 A | 9/2006 |
| JP | 2010-172698 A | 8/2010 |

*Primary Examiner* — Raeann Gorden

(74) *Attorney, Agent, or Firm* — Birch, Stewart, Kolasch & Birch, LLP

(57) ABSTRACT

A golf ball 2 includes a spherical core 4 and a cover 6 covering the core 4. The cover 6 includes an inner cover 8 and an outer cover 10 positioned outside the inner cover 8. The core 4 is obtained by a rubber composition being crosslinked. The rubber composition includes a base rubber (a), a co-crosslinking agent (b), a crosslinking initiator (c), and a carboxylate (d). The co-crosslinking agent (b) is: (b1) an α,β-unsaturated carboxylic acid having 3 to 8 carbon atoms; or (b2) a metal salt of an α,β-unsaturated carboxylic acid having 3 to 8 carbon atoms. The amount of the carboxylate (d) is equal to or greater than 1 parts by weight but less than 40 parts by weight per 100 parts by weight of the base rubber (a). A hardness of an innermost layer of the cover is greater than a surface hardness of the core.

15 Claims, 2 Drawing Sheets

(56) References Cited

U.S. PATENT DOCUMENTS

| | | |
|---|---|---|
| 2008/0194357 A1 | 8/2008 | Higuchi |
| 2008/0194358 A1 | 8/2008 | Higuchi |
| 2008/0194359 A1 | 8/2008 | Higuchi et al. |
| 2008/0214324 A1 | 9/2008 | Nanba et al. |
| 2008/0214325 A1 | 9/2008 | Higuchi et al. |
| 2008/0312008 A1 | 12/2008 | Higuchi et al. |
| 2009/0124757 A1 | 5/2009 | Shindo et al. |
| 2010/0190575 A1 | 7/2010 | Umezawa et al. |
| 2010/0273575 A1* | 10/2010 | Watanabe .......... A63B 37/0003 473/373 |

* cited by examiner

GOLF BALL

This application claims priority on Patent Application No. 2011-145379 filed in JAPAN on Jun. 30, 2011. The entire contents of this Japanese Patent Application are hereby incorporated by reference.

BACKGROUND OF THE INVENTION

1. Field of the Invention

The present invention relates to golf balls. Specifically, the present invention relates to golf balls that include a solid core and a cover having two or more layers.

2. Description of the Related Art

Golf players' foremost requirement for golf balls is flight performance. In particular, golf players place importance on flight performance upon shots with a driver and a long iron. Flight performance correlates with the resilience performance of a golf ball. When a golf ball having excellent resilience performance is hit, the golf ball flies at a high speed, thereby achieving a large flight distance. Golf balls that include a core having excellent resilience performance are disclosed in JPS61-37178, JP2008-212681 (US2008/0214324), JP2008-523952 (US2006/0135287 and US2007/0173607), and JP2009-119256 (US2009/0124757).

The core disclosed in JPS61-37178 is obtained from a rubber composition that includes a co-crosslinking agent and a crosslinking activator. This publication discloses palmitic acid, stearic acid, and myristic acid as the crosslinking activator.

The core disclosed in JP2008-212681 is obtained from a rubber composition that includes an organic peroxide, a metal salt of an α,β-unsaturated carboxylic acid, and a copper salt of a fatty acid.

The core disclosed in JP2008-523952 is obtained from a rubber composition that includes a metal salt of an unsaturated monocarboxylic acid, a free radical initiator, and a non-conjugated diene monomer.

The core disclosed in JP2009-119256 is obtained from a rubber composition that includes a polybutadiene whose vinyl content is equal to or less than 2%, whose cis 1,4-bond content is equal to or greater than 80%, and which has an active end modified with an alkoxysilane compound.

An appropriate trajectory height is required in order to achieve a large flight distance. A trajectory height depends on a spin rate and a launch angle. In a golf ball that achieves a high trajectory by a high spin rate, a flight distance is insufficient. In a golf ball that achieves a high trajectory by a high launch angle, a large flight distance is obtained. Use of an outer-hard/inner-soft structure in a golf ball can achieve a low spin rate and a high launch angle. Modifications regarding a hardness distribution of a core are disclosed in JPH6-154357 (U.S. Pat. No. 5,403,010), JP2008-194471 (U.S. Pat. No. 7,344,455, US2008/0194358, US2008/0194359, and US2008/0214325), and JP2008-194473 (US2008/0194357 and US2008/0312008).

In the core disclosed in JPH6-154357, a JIS-C hardness H1 at the central point of the core is 58 to 73, a JIS-C hardness H2 in a region that extends over a distance range from equal to or greater than 5 mm to equal to or less than 10 mm from the central point of the core is equal to or greater than 65 but equal to or less than 75, a JIS-C hardness H3 at a point located at a distance of 15 mm from the central point is equal to or greater than 74 but equal to or less than 82, and a JIS-C hardness H4 at the surface of the core is equal to or greater than 76 but equal to or less than 84. The hardness H2 is greater than the hardness H1, the hardness H3 is greater than the hardness H2, and the hardness H4 is equal to or greater than the hardness H3.

In the core disclosed in JP2008-194471, a Shore D hardness at the central point of the core is equal to or greater than 30 but equal to or less than 48, a Shore D hardness at a point located at a distance of 4 mm from the central point is equal to or greater than 34 but equal to or less than 52, a Shore D hardness at a point located at a distance of 8 mm from the central point is equal to or greater than 40 but equal to or less than 58, a Shore D hardness at a point located at a distance of 12 mm from the central point is equal to or greater than 43 but equal to or less than 61, a Shore D hardness in a region that extends over a distance range from equal to or greater than 2 mm to equal to or less than 3 mm from the surface of the core is equal to or greater than 36 but equal to or less than 54, and a Shore D hardness at the surface of the core is equal to or greater than 41 but equal to or less than 59.

In the core disclosed in JP2008-194473, a Shore D hardness at the central point of the core is equal to or greater than 25 but equal to or less than 45, a Shore D hardness in a region that extends over a distance range from equal to or greater than 5 mm to equal to or less than 10 mm from the central point is equal to or greater than 39 but equal to or less than 58, a Shore D hardness at a point located at a distance of 15 mm from the central point is equal to or greater than 36 but equal to or less than 55, and a Shore D hardness at the surface of the core is equal to or greater than 55 but equal to or less than 75.

JP2010-253268 (US2010/0273575) discloses a golf ball that includes a core, an envelope layer, a mid layer, and a cover. In the core, the hardness gradually increases from the central point of the core to the surface of the core. The difference between a JIS-C hardness at the surface and a JIS-C hardness at the central point is equal to or greater than 15. The hardness of the cover is greater than the hardness of the mid layer, and the hardness of the mid layer is greater than the hardness of the envelope layer.

For a tee shot on a par-three hole and a second shot on a par-four hole, a middle iron is frequently used. Golf players also desire a large flight distance upon a shot with a middle iron. An object of the present invention is to provide a golf ball that has excellent flight performance upon a shot with a middle iron.

SUMMARY OF THE INVENTION

A golf ball according to the present invention comprises a spherical core and a cover which covers the core and has two or more layers. The core is obtained by a rubber composition being crosslinked. The rubber composition includes:
   (a) a base rubber;
   (b) a co-crosslinking agent;
   (c) a crosslinking initiator; and
   (d) a carboxylate.
The co-crosslinking agent (b) is:
   (b1) an α,β-unsaturated carboxylic acid having 3 to 8 carbon atoms; or
   (b2) a metal salt of an α,β-unsaturated carboxylic acid having 3 to 8 carbon atoms.
An amount of the carboxylate (d) is equal to or greater than 1 parts by weight but less than 40 parts by weight per 100 parts by weight of the base rubber (a). A JIS-C hardness Hi of an innermost layer of the cover is greater than a JIS-C hardness Hs at a surface of the core.

In the golf ball according to the present invention, a hardness distribution is appropriate. In the golf ball, the energy loss is low when being hit with a middle iron. The golf ball has excellent resilience performance. When the golf ball is hit with a middle iron, the spin rate is low. The great resilience performance and the low spin rate achieve a large flight distance.

Preferably, the hardness Hi is equal to or greater than 80.0 but equal to or less than 95.0. Preferably, the hardness Hs is equal to or greater than 78.0 but equal to or less than 95.0.

Preferably, the rubber composition further includes an organic sulfur compound (e).

When the rubber composition includes the $\alpha,\beta$-unsaturated carboxylic acid (b1), the rubber composition further includes a metal compound (f).

Preferably, the carboxylate (d) is a fatty acid salt. Preferably, the carboxylate (d) is a salt of a saturated fatty acid. Preferably, a carbon number of a carboxylic acid component of the carboxylate (d) is equal to or greater than 4 but equal to or less than 30.

Preferably, the rubber composition includes the metal salt (b2) of the $\alpha,\beta$-unsaturated carboxylic acid.

Preferably, the organic sulfur compound (e) is a thiophenol, a polysulfide having 2 to 4 sulfur atoms, a thionaphthol or a thiuram, or a metal salt thereof.

Preferably, the rubber composition includes 15 parts by weight or greater but 50 parts by weight or less of the co-crosslinking agent (b) per 100 parts by weight of the base rubber (a). Preferably, the rubber composition includes 0.2 parts by weight or greater but 5.0 parts by weight or less of the crosslinking initiator (c) per 100 parts by weight of the base rubber (a). Preferably, the rubber composition includes 0.05 parts by weight or greater but 5 parts by weight or less of the organic sulfur compound (e) per 100 parts by weight of the base rubber (a).

Preferably, a difference (Hs−H(0)) between the hardness Hs and a JIS-C hardness H(0) at a central point of the core is equal to or greater than 15. Preferably, a JIS-C hardness H(0) at a central point of the core is equal to or greater than 40.0 but equal to or less than 70.0.

Preferably, a difference (Hi−Hs) between the hardness Hi and the hardness Hs is equal to or greater than 1 but equal to or less than 5. Preferably, a difference (Ho−Hi) between a JIS-C hardness Ho of an outermost layer of the cover and the JIS-C hardness Hi of the innermost layer of the cover is equal to or greater than 2 but equal to or less than 10.

Preferably, in a hardness distribution curve from a central point of the core to an outermost layer of the cover, a hardness of the outermost layer is the greatest.

Preferably, a total thickness of the cover is equal to or less than 2.5 mm.

When distances (mm) from a central point of the core to the surface of the core and eight points, and JIS-C hardnesses at the surface of the core and the eight points, which eight points are obtained by dividing a region from the central point of the core to the surface of the core at intervals of 2.5 mm, are plotted in a graph, $R^2$ of a linear approximation curve obtained by a least-square method is preferably equal to or greater than 0.95.

DESCRIPTION OF THE PREFERRED EMBODIMENTS

The following will describe in detail the present invention, based on preferred embodiments with reference to the accompanying drawings.

Figure 1:
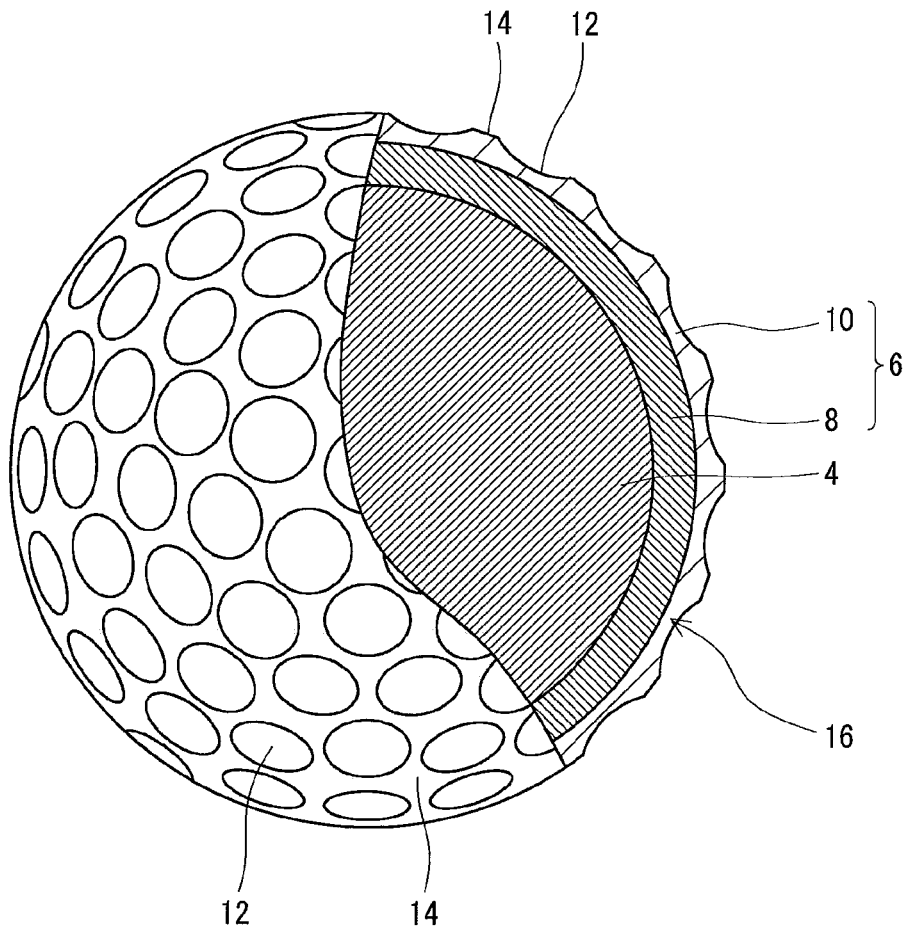
FIG. 1 is a partially cutaway cross-sectional view of a golf ball according to one embodiment of the present invention.

A golf ball 2 shown in FIG. 1 includes a spherical core 4 and a cover 6 covering the core 4. The cover 6 includes an inner cover 8 and an outer cover 10 positioned outside the inner cover 8. The inner cover 8 is an innermost layer of the cover 6. The outer cover 10 is an outermost layer of the cover 6. The cover 6 may include another one or more layers between the inner cover 8 and the outer cover 10. On the surface of the outer cover 10, a large number of dimples 12 are formed. Of the surface of the golf ball 2, a part other than the dimples 12 is a land 14. The golf ball 2 includes a paint layer and a mark layer on the external side of the outer cover 10 although these layers are not shown in the drawing.

The golf ball 2 has a diameter of 40 mm or greater but 45 mm or less. From the standpoint of conformity to the rules established by the United States Golf Association (USGA), the diameter is preferably equal to or greater than 42.67 mm. In light of suppression of air resistance, the diameter is preferably equal to or less than 44 mm and more preferably equal to or less than 42.80 mm. The golf ball 2 has a weight of 40 g or greater but 50 g or less. In light of attainment of great inertia, the weight is preferably equal to or greater than 44 g and more preferably equal to or greater than 45.00 g. From the standpoint of conformity to the rules established by the USGA, the weight is preferably equal to or less than 45.93 g.

The core 4 is obtained by crosslinking a rubber composition. The rubber composition includes:
(a) a base rubber;
(b) a co-crosslinking agent;
(c) a crosslinking initiator; and
(d) a carboxylate.

During heating and forming of the core 4, the base rubber (a) is crosslinked by the co-crosslinking agent (b). The heat of the crosslinking reaction remains near the central point of the core 4. Thus, during heating and forming of the core 4, the temperature at the central portion is high. The temperature gradually decreases from the central point toward the surface. The carboxylate (d) reacts with a metal salt of the co-crosslinking agent (b) to exchange cation. This exchange reaction is likely to take place in the central portion of the core 4 where the temperature is high, and is unlikely to take place near the surface of the core 4. In other words, breaking of metal crosslinks is likely to occur in the central portion of the core 4 and is unlikely to occur near the surface of the core 4. As a result, the crosslinking density of the core 4 increases from its central point toward its surface. The core 4 can achieve an outer-hard/inner-soft structure. Further, when the rubber composition includes an organic sulfur compound (e) together with the carboxylate (d), the gradient of a hardness distribution can be controlled, and the degree of the outer-hard/inner-soft structure of the core 4 can be increased. When the golf ball 2 that includes the core 4 is hit with a middle iron, the spin rate is low. The golf ball 2 achieves excellent flight performance upon a shot with a middle iron.

Figure 2:
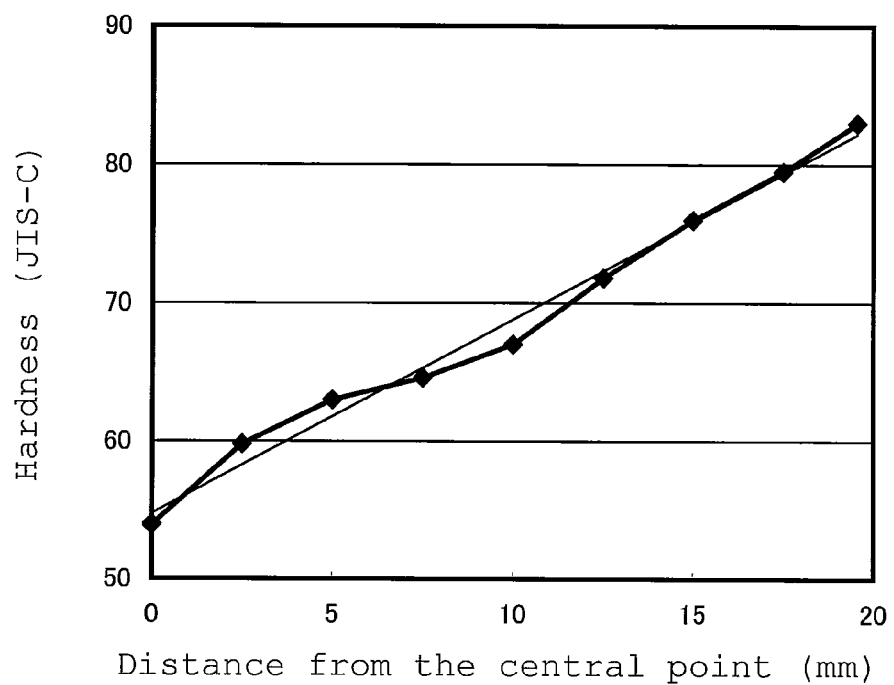
FIG. 2 is a line graph showing a hardness distribution of a core of the golf ball in FIG. 1.

FIG. 2 is a line graph showing a hardness distribution of the core 4 of the golf ball 2 in FIG. 1. The horizontal axis of the graph indicates a distance (mm) from the central point of the core 4. The vertical axis of the graph indicates a JIS-C hardness. Eight measuring points obtained by dividing a region from the central point of the core 4 to the surface of the core 4 at intervals of 2.5 mm are plotted in the graph. A measuring point on the surface of the core 4 is also plotted in the graph.

The distance from the central point of the core 4 to each of these measuring points is as follows.

First point: 0.0 mm (central point)
Second point: 2.5 mm
Third point: 5.0 mm
Fourth point: 7.5 mm
Fifth point: 10.0 mm
Sixth point: 12.5 mm
Seventh point: 15.0 mm
Eighth point: 17.5 mm
Ninth point: surface Hardnesses at the first to eighth points are measured by pressing a JIS-C type hardness scale against a cut plane of the core 4 that has been cut into two halves. A hardness Hs at the ninth point is measured by pressing the JIS-C type hardness scale against the surface of the core 4. For the measurement, an automated rubber hardness measurement machine (trade name "P1", manufactured by Kobunshi Keiki Co., Ltd.), to which this hardness scale is mounted, is used. In the present invention, a JIS-C hardness at a measuring point whose distance from the central point of the core 4 is x mm is represented by H(x). A hardness at the central point of the core 4 is represented by H(0).

FIG. 2 also shows a linear approximation curve obtained by a least-square method on the basis of the distances and the hardnesses of the nine measuring points. As is clear from FIG. 2, the broken line does not greatly deviate from the linear approximation curve. In other words, the broken line has a shape close to the linear approximation curve. In the core 4, the hardness linearly increases from its central point to its surface. When the core 4 is hit with a middle iron, the energy loss is low. The core 4 has excellent resilience performance. When the golf ball 2 is hit with a middle iron, the flight distance is large.

In the core 4, $R^2$ of the linear approximation curve obtained by the least-square method is equal to or greater than 0.95. $R^2$ is an index indicating the linearity of the broken line. For the core 4 for which $R^2$ is equal to or greater than 0.95, the shape of the broken line of the hardness distribution is close to a straight line. The core 4 for which $R^2$ is equal to or greater than 0.95 has excellent resilience performance. $R^2$ is more preferably equal to or greater than 0.96 and particularly preferably equal to or greater than 0.97. $R^2$ is calculated by squaring a correlation coefficient R. The correlation coefficient R is calculated by dividing the covariance of the distance (%) from the central point and the hardness (JIS-C) by the standard deviation of the distance (%) from the central point and the standard deviation of the hardness (JIS-C).

Examples of the base rubber (a) of the core 4 include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred that the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40% by weight and more preferably equal to or greater than 80% by weight.

A polybutadiene in which the proportion of 1,2-vinyl bonds is equal to or less than 2.0% by weight is preferred. The polybutadiene can contribute to the resilience performance of the core 4. In this respect, the proportion of 1,2-vinyl bonds is preferably equal to or less than 1.7% by weight and particularly preferably equal to or less than 1.5% by weight.

From the standpoint that a polybutadiene having a low proportion of 1,2-vinyl bonds and excellent polymerization activity is obtained, it is preferred that a rare-earth-element-containing catalyst is used for synthesizing a polybutadiene. In particular, a polybutadiene synthesized with a catalyst containing neodymium, which is a lanthanum-series rare earth element compound, is preferred.

The polybutadiene has a Mooney viscosity ($ML_{1+4}$(100° C.)) of preferably 30 or greater, more preferably 32 or greater, and particularly preferably 35 or greater. The Mooney viscosity ($ML_{1+4}$(100° C.)) is preferably equal to or less than 140, more preferably equal to or less than 120, even more preferably equal to or less than 100, and particularly preferably equal to or less than 80. The Mooney viscosity ($ML_{1+4}$ (100° C.)) is measured according to the standards of "JIS K6300". The measurement conditions are as follows.

Rotor: L rotor
Preheating time: 1 minute
Rotating time of rotor: 4 minutes
Temperature: 100° C.

In light of workability, the polybutadiene has a molecular weight distribution (Mw/Mn) of preferably 2.0 or greater, more preferably 2.2 or greater, even more preferably 2.4 or greater, and particularly preferably 2.6 or greater. In light of resilience performance, the molecular weight distribution (Mw/Mn) is preferably equal to or less than 6.0, more preferably equal to or less than 5.0, even more preferably equal to or less than 4.0, and particularly preferably equal to or less than 3.4. The molecular weight distribution (Mw/Mn) is calculated by dividing the weight average molecular weight Mw by the number average molecular weight Mn.

The molecular weight distribution is measured by gel permeation chromatography ("HLC-8120GPC" manufactured by Tosoh Corporation). The measurement conditions are as follows.

Detector: differential refractometer
Column: GMHHXL (manufactured by Tosoh Corporation)
Column temperature: 40° C.
Mobile phase: tetrahydrofuran The molecular weight distribution is calculated as a value obtained by conversion using polystyrene standard.

The co-crosslinking agent (b) is:
(b1) an α,β-unsaturated carboxylic acid having 3 to 8 carbon atoms; or
(b2) a metal salt of an α,β-unsaturated carboxylic acid having 3 to 8 carbon atoms.

The rubber composition may include only the α,β-unsaturated carboxylic acid (b1) or only the metal salt (b2) of the α,β-unsaturated carboxylic acid as the co-crosslinking agent (b). The rubber composition may include both the α,β-unsaturated carboxylic acid (b1) and the metal salt (b2) of the α,β-unsaturated carboxylic acid as the co-crosslinking agent (b).

The metal salt (b2) of the α,β-unsaturated carboxylic acid graft-polymerizes with the molecular chain of the base rubber, thereby crosslinking the rubber molecules. When the rubber composition includes the α,β-unsaturated carboxylic acid (b1), the rubber composition preferably further includes a metal compound (f). The metal compound (f) reacts with the α,β-unsaturated carboxylic acid (b1) in the rubber composition. A salt obtained by this reaction graft-polymerizes with the molecular chain of the base rubber.

Examples of the metal compound (f) include metal hydroxides such as magnesium hydroxide, zinc hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, zinc carbonate, calcium carbonate, sodium carbonate, lithium carbonate, and potassium carbonate. A compound that includes a bivalent metal is preferred. The compound that includes the bivalent metal reacts with the co-crosslinking agent (b) to form metal crosslinks. The metal compound (f) is particularly preferably a zinc compound. Two or more metal compounds may be used in combination.

Examples of the α,β-unsaturated carboxylic acids include acrylic acid, methacrylic acid, fumaric acid, maleic acid, and crotonic acid. Examples of the metal component in the metal salt (b2) of the α,β-unsaturated carboxylic acid include sodium ion, potassium ion, lithium ion, magnesium ion, calcium ion, zinc ion, barium ion, cadmium ion, aluminum ion, tin ion, and zirconium ion. The metal salt (b2) of the α,β-unsaturated carboxylic acid may include two or more types of ions. From the standpoint that metal crosslinks are likely to occur between the rubber molecules, bivalent metal ions such as magnesium ion, calcium ion, zinc ion, barium ion, and cadmium ion are preferred. The metal salt (b2) of the α,β-unsaturated carboxylic acid is particularly preferably zinc acrylate.

In light of resilience performance of the golf ball 2, the amount of the co-crosslinking agent (b) is preferably equal to or greater than 15 parts by weight and particularly preferably equal to or greater than 20 parts by weight, per 100 parts by weight of the base rubber. In light of feel at impact, the amount is preferably equal to or less than 50 parts by weight, more preferably equal to or less than 45 parts by weight, and particularly preferably equal to or less than 40 parts by weight, per 100 parts by weight of the base rubber.

The crosslinking initiator (c) is preferably an organic peroxide. The organic peroxide contributes to the resilience performance of the golf ball 2. Examples of preferable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. In light of versatility, dicumyl peroxide is preferred.

In light of resilience performance of the golf ball 2, the amount of the crosslinking initiator (c) is preferably equal to or greater than 0.2 parts by weight and particularly preferably equal to or greater than 0.5 parts by weight, per 100 parts by weight of the base rubber. In light of feel at impact and durability of the golf ball 2, the amount is preferably equal to or less than 5.0 parts by weight and particularly preferably equal to or less than 2.5 parts by weight, per 100 parts by weight of the base rubber.

The co-crosslinking agent (b) is not included in the carboxylate (d). The carboxylic acid component of the carboxylate (d) has a carboxyl group. The carboxylate (d) exchanges a cationic component with the co-crosslinking agent (b). It is inferred that the carboxylate (d) breaks the metal crosslinks by the co-crosslinking agent (b) at the central portion of the core 4 during heating and forming of the core 4.

The carbon number of the carboxylic acid component of the carboxylate (d) is preferably equal to or greater than 4 but equal to or less than 30, is more preferably equal to or greater than 9 but equal to or less than 30, and is particularly preferably equal to or greater than 14 but equal to or less than 28. Examples of the carboxylic acid include aliphatic carboxylic acids (fatty acids) and aromatic carboxylic acids. Salts of fatty acids are preferred.

The rubber composition may include a salt of a saturated fatty acid or may include a salt of an unsaturated fatty acid. The salt of the saturated fatty acid is preferred.

Examples of fatty acids include butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linolic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). Two or more fatty acid salts may be used in combination. Salts of myristic acid, palmitic acid, stearic acid, behenic acid, and oleic acid are preferred.

An aromatic carboxylic acid has an aromatic ring and a carboxyl group. Examples of aromatic carboxylic acids include benzoic acid, phthalic acid, isophthalic acid, terephthalic acid, hemimellitic acid (benzene-1,2,3-tricarboxylic acid), trimellitic acid (benzene-1,2,4-tricarboxylic acid), trimesic acid (benzene-1,3,5-tricarboxylic acid), mellophanic acid (benzene-1,2,3,4-tetracarboxylic acid), prehnitic acid (benzene-1,2,3,5-tetracarboxylic acid), pyromellitic acid (benzene-1,2,4,5-tetracarboxylic acid), mellitic acid (benzene hexacarboxylic acid), diphenic acid (biphenyl-2,2'-dicarboxylic acid), toluic acid (methylbenzoic acid), xylic acid, prehnitylic acid (2,3,4-trimethylbenzoic acid), γ-isodurylic acid (2,3,5-trimethylbenzoic acid), durylic acid (2,4,5-trimethylbenzoic acid), β-isodurylic acid (2,4,6-trimethylbenzoic acid), α-isodurylic acid (3,4,5-trimethylbenzoic acid), cuminic acid (4-isopropylbenzoic acid), uvitic acid (5-methylisophthalic acid), α-toluic acid (phenylacetic acid), hydratropic acid (2-phenylpropanoic acid), and hydrocinnamic acid (3-phenylpropanoic acid).

The rubber composition may include a salt of an aromatic carboxylic acid substituted with a hydroxyl group, an alkoxy group, or an oxo group. Examples of this carboxylic acid can include salicylic acid (2-hydroxybenzoic acid), anisic acid (methoxybenzoic acid), cresotinic acid (hydroxy(methyl)benzoicacid), o-homosalicylic acid (2-hydroxy-3-methylbenzoic acid), m-homosalicylic acid (2-hydroxy-4-methylbenzoic acid), p-homosalicylic acid (2-hydroxy-5-methylbenzoic acid), o-pyrocatechuic acid (2,3-dihydroxybenzoic acid), β-resorcylic acid (2,4-dihydroxybenzoic acid), γ-resorcylic acid (2,6-dihydroxybenzoic acid), protocatechuic acid (3,4-dihydroxybenzoic acid), α-resorcylic acid (3,5-dihydroxybenzoic acid), vanillic acid (4-hydroxy-3-methoxybenzoic acid), isovanillic acid (3-hydroxy-4-methoxybenzoic acid), veratric acid (3,4-dimethoxybenzoic acid), o-veratric acid (2,3-dimethoxybenzoic acid), orsellinic acid (2,4-dihydroxy-6-methylbenzoic acid), m-hemipinic acid (4,5-dimethoxyphthalic acid), gallic acid (3,4,5-trihydroxybenzoic acid), syringic acid (4-hydroxy-3,5-dimethoxybenzoic acid), asaronic acid (2,4,5-trimethoxybenzoic acid), mandelic acid (hydroxy(phenyl)acetic acid), vanillylmandelic acid (hydroxy(4-hydroxy-3-methoxyphenyl)acetic acid), homoanisic acid ((4-methoxyphenyl)acetic acid), homogentisic acid ((2,5-dihydroxyphenyl)acetic acid), homoprotocatechuic acid ((3,4-dihydroxyphenyl)acetic acid), homovanillic acid ((4-hydroxy-3-methoxyphenyl)acetic acid), homoisovanillic acid ((3-hydroxy-4-methoxyphenyl)acetic acid), homoveratric acid ((3,4-dimethoxyphenyl)acetic acid), o-homoveratric acid ((2,3-dimethoxyphenyl)acetic acid), homophthalic acid (2-(carboxymethyl)benzoic acid), homoisophthalic acid (3-(carboxymethyl)benzoic acid), homoterephthalic acid (4-(carboxymethyl)benzoic acid), phthalonic acid (2-(carboxycarbonyl)benzoic acid), isophthalonic acid (3-(carboxycarbonyl)benzoic acid), terephthalonic acid (4-(carboxycarbonyl)benzoic acid), benzilic acid (hydroxydiphenylacetic acid), atrolactic acid (2-hydroxy-2-phenylpropanoic acid), tropic acid (3-hydroxy-2-phenylpropanoic acid), melilotic acid (3-(2-hydroxyphenyl)propanoic acid), phloretic acid (3-(4-hydroxyphenyl)propanoic acid), hydrocaffeic acid (3-(3,4-dihydroxyphenyl)propanoic acid), hydroferulic acid (3-(4-hydroxy-3-methoxyphenyl)propanoic acid), hydroisoferulic acid (3-(3-hydroxy-4-methoxyphenyl)propanoic acid), p-coumaric acid (3-(4-hydroxyphenyl)acrylic acid), umbellic acid (3-(2,4-dihydroxyphenyl)acrylic acid), caffeic acid (3-(3,4-dihydroxyphenyl)acrylic acid), ferulic acid (3-(4-hydroxy-3-methoxyphenyl)acrylic acid), isoferulic acid (3-(3-hydroxy-4-methoxyphenyl)acrylic acid), and sinapic acid (3-(4-hydroxy-3,5-dimethoxyphenyl)acrylic acid).

The cationic component of the carboxylate is a metal ion or an organic cation. Examples of the metal ion include sodium ion, potassium ion, lithium ion, silver ion, magnesium ion, calcium ion, zinc ion, barium ion, cadmium ion, copper ion, cobalt ion, nickel ion, manganese ion, aluminum ion, iron ion, tin ion, zirconium ion, and titanium ion. Two or more types of ions may be used in combination.

The organic cation is a cation having a carbon chain. Examples of the organic cation include organic ammonium ions. Examples of organic ammonium ions include primary ammonium ions such as stearylammonium ion, hexylammonium ion, octylammonium ion, and 2-ethylhexylammonium ion; secondary ammonium ions such as dodecyl(lauryl)ammonium ion, and octadecyl(stearyl)ammonium ion; tertiary ammonium ions such as trioctylammonium ion; and quaternary ammonium ions such as dioctyldimethylammonium ion, and distearyldimethylammonium ion. Two or more types of organic cations may be used in combination.

Examples of preferable carboxylates include a potassium salt, a magnesium salt, an aluminum salt, a zinc salt, an iron salt, a copper salt, a nickel salt, or a cobalt salt of myristic acid, palmitic acid, stearic acid, behenic acid, or oleic acid.

In light of linearity of the hardness distribution of the core 4, the amount of the carboxylate (d) is preferably equal to or greater than 1 parts by weight, more preferably equal to or greater than 7.5 parts by weight, even more preferably equal to or greater than 10.0, and particularly preferably equal to or greater than 12.0, per 100 parts by weight of the base rubber. In light of resilience performance, the amount is preferably equal to or less than 40 parts by weight, more preferably equal to or less than 30 parts by weight, and particularly preferably equal to or less than 20 parts by weight, per 100 parts by weight of the base rubber.

The weight ratio of the co-crosslinking agent (b) and the carboxylate (d) in the rubber composition is preferably equal to or greater than 3/7 but equal to or less than 8/2, and is particularly preferably equal to or greater than 4/6 but equal to or less than 7/3. From the rubber composition in which this weight ratio is within the above range, the core 4 whose hardness linearly increases from its central point toward its surface can be obtained.

As the co-crosslinking agent (b), zinc acrylate is preferably used. Zinc acrylate whose surface is coated with a carboxylate for the purpose of improving dispersibility to rubber is present. When the rubber composition includes this zinc acrylate, the coating material serves as the carboxylate (d). For example, when the rubber composition includes 25 parts by weight of zinc acrylate that includes 10% by weight of a carboxylate, the amount of the carboxylate (d) is regarded as 2.5 parts by weight, and the amount of the zinc acrylate is regarded as 22.5 parts by weight.

The rubber composition preferably further includes an organic sulfur compound (e). The organic sulfur compound (e) can contribute to control of: the linearity of the hardness distribution of the core 4; and the degree of the outer-hard/inner-soft structure. An example of the organic sulfur compound (e) is an organic compound having a thiol group or a polysulfide linkage having 2 to 4 sulfur atoms. A metal salt of this organic compound is also included in the organic sulfur compound (e). Examples of the organic sulfur compound (e) include aliphatic compounds such as aliphatic thiols, aliphatic thiocarboxylic acids, aliphatic dithiocarboxylic acids, and aliphatic polysulfides; heterocyclic compounds; alicyclic compounds such as alicyclic thiols, alicyclic thiocarboxylic acids, alicyclic dithiocarboxylic acids, and alicyclic polysulfides; and aromatic compounds. Specific examples of the organic sulfur compound (e) include thiophenols, thionaphthols, polysulfides, thiocarboxylic acids, dithiocarboxylic acids, sulfenamides, thiurams, dithiocarbamates, and thiazoles. Preferable organic sulfur compounds are thiophenols, polysulfides having 2 to 4 sulfur atoms, thionaphthols, thiurams, and metal salts thereof.

Specific examples of the organic sulfur compound (e) are represented by the following chemical formulas (1) to (4).

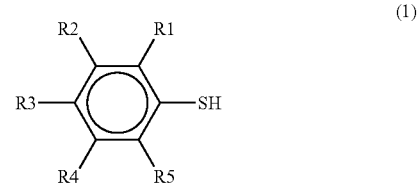

In the chemical formula (1), R1 to R5 each represent H or a substituent.

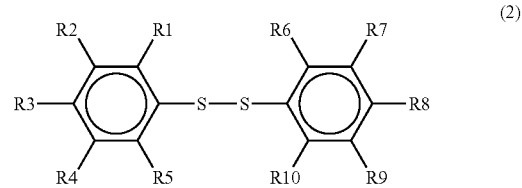

In the chemical formula (2), R1 to R10 each represent H or a substituent.

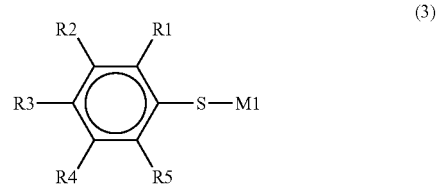

In the chemical formula (3), R1 to R5 each represent H or a substituent, and M1 represents a monovalent metal atom.

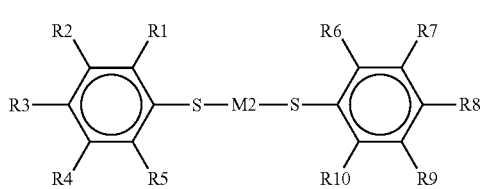

(4)

In the chemical formula (4), R1 to R10 each represent H or a substituent, and M2 represents a bivalent metal atom.

In the formulas (1) to (4), each substituent is at least one group selected from the group consisting of a halogen group (F, Cl, Br, I), an alkyl group, a carboxyl group (—COOH), an ester (—COOR) of a carboxyl group, a formyl group (—CHO), an acyl group (—COR), a carbonyl halide group (—COX), a sulfo group (—SO$_3$H), an ester (—SO$_3$R) of a sulfo group, a sulfonyl halide group (—SO$_2$X), a sulfino group (—SO$_2$H), an alkylsulfinyl group (—SOR), a carbamoyl group (—CONH$_2$), an alkyl halide group, a cyano group (—CN), and an alkoxy group (—OR).

Examples of the organic sulfur compound represented by the chemical formula (1) include thiophenol; thiophenols substituted with halogen groups, such as 4-fluorothiophenol, 2,5-difluorothiophenol, 2,4,5-trifluorothiophenol, 2,4,5,6-tetrafluorothiophenol, pentafluorothiophenol, 2-chlorothiophenol, 4-chlorothiophenol, 2,4-dichlorothiophenol, 2,5-dichlorothiophenol, 2,4,5-trichlorothiophenol, 2,4,5,6-tetrachlorothiophenol, pentachlorothiophenol, 4-bromothiophenol, 2,5-dibromothiophenol, 2,4,5-tribromothiophenol, 2,4,5,6-tetrabromothiophenol, pentabromothiophenol, 4-iodothiophenol, 2,5-diiodothiophenol, 2,4,5-triiodothiophenol, 2,4,5,6-tetraiodothiophenol, and pentaiodothiophenol; thiophenols substituted with alkyl groups, such as 4-methylthiophenol, 2,4,5-trimethylthiophenol, pentamethylthiophenol, 4-t-butylthiophenol, 2,4,5-tri-t-butylthiophenol, and penta-t-butylthiophenol; thiophenols substituted with carboxyl groups, such as 4-carboxythiophenol, 2,4,6-tricarboxythiophenol, and pentacarboxythiophenol; thiophenols substituted with alkoxycarbonyl groups, such as 4-methoxycarbonylthiophenol, 2,4,6-trimethoxycarbonylthiophenol, and pentamethoxycarbonylthiophenol; thiophenols substituted with formyl groups, such as 4-formylthiophenol, 2,4,6-triformylthiophenol, and pentaformylthiophenol; thiophenols substituted with acyl groups, such as 4-acetylthiophenol, 2,4,6-triacetylthiophenol, and pentaacetylthiophenol; thiophenols substituted with carbonyl halide groups, such as 4-chlorocarbonylthiophenol, 2,4,6-tri(chlorocarbonyl)thiophenol, and penta(chlorocarbonyl)thiophenol; thiophenols substituted with sulfo groups, such as 4-sulfothiophenol, 2,4,6-trisulfothiophenol, and pentasulfothiophenol; thiophenols substituted with alkoxysulfonyl groups, such as 4-methoxysulfonylthiophenol, 2,4,6-trimethoxysulfonylthiophenol, and pentamethoxysulfonylthiophenol; thiophenols substituted with sulfonyl halide groups, such as 4-chlorosulfonylthiophenol, 2,4,6-tri(chlorosulfonyl)thiophenol, and penta(chlorosulfonyl)thiophenol; thiophenols substituted with sulfino groups, such as 4-sulfinothiophenol, 2,4,6-trisulfinothiophenol, and pentasulfinothiophenol; thiophenols substituted with alkylsulfinyl groups, such as 4-methylsulfinylthiophenol, 2,4,6-tri(methylsulfinyl)thiophenol, and penta(methylsulfinyl)thiophenol; thiophenols substituted with carbamoyl groups, such as 4-carbamoylthiophenol, 2,4,6-tricarbamoylthiophenol, and pentacarbamoylthiophenol; thiophenols substituted with alkyl halide groups, such as 4-trichloromethylthiophenol, 2,4,6-tri(trichloromethyl) thiophenol, and penta(trichloromethyl)thiophenol; thiophenols substituted with cyano groups, such as 4-cyanothiophenol, 2,4,6-tricyanothiophenol, and pentacyanothiophenol; and thiophenols substituted with alkoxy groups, such as 4-methoxythiophenol, 2,4,6-trimethoxythiophenol, and pentamethoxythiophenol. Each of these thiophenols is substituted with one type of substituent.

Another example of the organic sulfur compound represented by the chemical formula (1) is a compound substituted with at least one type of the above substituents and another substituent. Examples of the other substituent include a nitro group (—NO$_2$), an amino group (—NH$_2$), a hydroxyl group (—OH), and a phenylthio group (—SPh). Specific examples of the compound include 4-chloro-2-nitrothiophenol, 4-chloro-2-aminothiophenol, 4-chloro-2-hydroxythiophenol, 4-chloro-2-phenylthiothiophenol, 4-methyl-2-nitrothiophenol, 4-methyl-2-aminothiophenol, 4-methyl-2-hydroxythiophenol, 4-methyl-2-phenylthiothiophenol, 4-carboxy-2-nitrothiophenol, 4-carboxy-2-aminothiophenol, 4-carboxy-2-hydroxythiophenol, 4-carboxy-2-phenylthiothiophenol, 4-methoxycarbonyl-2-nitrothiophenol, 4-methoxycarbonyl-2-aminothiophenol, 4-methoxycarbonyl-2-hydroxythiophenol, 4-methoxycarbonyl-2-phenylthiothiophenol, 4-formyl-2-nitrothiophenol, 4-formyl-2-aminothiophenol, 4-formyl-2-hydroxythiophenol, 4-formyl-2-phenylthiothiophenol, 4-acetyl-2-nitrothiophenol, 4-acetyl-2-aminothiophenol, 4-acetyl-2-hydroxythiophenol, 4-acetyl-2-phenylthiothiophenol, 4-chlorocarbonyl-2-nitrothiophenol, 4-chlorocarbonyl-2-aminothiophenol, 4-chlorocarbonyl-2-hydroxythiophenol, 4-chlorocarbonyl-2-phenylthiothiophenol, 4-sulfo-2-nitrothiophenol, 4-sulfo-2-aminothiophenol, 4-sulfo-2-hydroxythiophenol, 4-sulfo-2-phenylthiothiophenol, 4-methoxysulfonyl-2-nitrothiophenol, 4-methoxysulfonyl-2-aminothiophenol, 4-methoxysulfonyl-2-hydroxythiophenol, 4-methoxysulfonyl-2-phenylthiothiophenol, 4-chlorosulfonyl-2-nitrothiophenol, 4-chlorosulfonyl-2-aminothiophenol, 4-chlorosulfonyl-2-hydroxythiophenol, 4-chlorosulfonyl-2-phenylthiothiophenol, 4-sulfino-2-nitrothiophenol, 4-sulfino-2-aminothiophenol, 4-sulfino-2-hydroxythiophenol, 4-sulfino-2-phenylthiothiophenol, 4-methylsulfinyl-2-nitrothiophenol, 4-methyl-2-aminosulfinylthiophenol, 4-methylsulfinyl-2-hydroxythiophenol, 4-methylsulfinyl-2-phenylthiothiophenol, 4-carbamoyl-2-nitrothiophenol, 4-carbamoyl-2-aminothiophenol, 4-carbamoyl-2-hydroxythiophenol, 4-carbamoyl-2-phenylthiothiophenol, 4-trichloromethyl-2-nitrothiophenol, 4-trichloromethyl-2-aminothiophenol, 4-trichloromethyl-2-hydroxythiophenol, 4-trichloromethyl-2-phenylthiothiophenol, 4-cyano-2-nitrothiophenol, 4-cyano-2-aminothiophenol, 4-cyano-2-hydroxythiophenol, 4-cyano-2-phenylthiothiophenol, 4-methoxy-2-nitrothiophenol, 4-methoxy-2-aminothiophenol, 4-methoxy-2-hydroxythiophenol, and 4-methoxy-2-phenylthiothiophenol.

Still another example of the organic sulfur compound represented by the chemical formula (1) is a compound substituted with two or more types of substituents. Specific examples of the compound include 4-acetyl-2-chlorothiophenol, 4-acetyl-2-methylthiophenol, 4-acetyl-2-carboxythiophenol, 4-acetyl-2-methoxycarbonylthiophenol, 4-acetyl-2-formylthiophenol, 4-acetyl-2-chlorocarbonylthiophenol, 4-acetyl-2-sulfothiophenol, 4-acetyl-2-methoxysulfonylthiophenol, 4-acetyl-2-chlorosulfonylthiophenol, 4-acetyl-2-sulfinothiophenol, 4-acetyl-2-methylsulfinylthiophenol, 4-acetyl-2-carbamoylthiophenol, 4-acetyl-2-trichloromethylthiophenol, 4-acetyl-2-cyanothiophenol, and 4-acetyl-2-methoxythiophenol.

Examples of the organic sulfur compound represented by the chemical formula (2) include diphenyl disulfide; diphenyl disulfides substituted with halogen groups, such as bis(4-fluorophenyl)disulfide, bis(2,5-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,4,5-triiodophenyl)disulfide, bis(2,4,5,6-tetraiodophenyl)disulfide, and bis(pentaiodophenyl)disulfide; diphenyl disulfides substituted with alkyl groups, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide; diphenyl disulfides substituted with carboxyl groups, such as bis(4-carboxyphenyl)disulfide, bis(2,4,6-tricarboxyphenyl)disulfide, and bis(pentacarboxyphenyl)disulfide; diphenyl disulfides substituted with alkoxycarbonyl groups, such as bis(4-methoxycarbonylphenyl)disulfide, bis(2,4,6-trimethoxycarbonylphenyl)disulfide, and bis(pentamethoxycarbonylphenyl)disulfide; diphenyl disulfides substituted with formyl groups, such as bis(4-formylphenyl)disulfide, bis(2,4,6-triformylphenyl)disulfide, and bis(pentaformylphenyl)disulfide; diphenyl disulfides substituted with acyl groups, such as bis(4-acetylphenyl)disulfide, bis(2,4,6-triacetylphenyl)disulfide, and bis(pentaacetylphenyl)disulfide; diphenyl disulfides substituted with carbonyl halide groups, such as bis(4-chlorocarbonylphenyl)disulfide, bis(2,4,6-tri(chlorocarbonyl)phenyl)disulfide, and bis(penta(chlorocarbonyl)phenyl)disulfide; diphenyl disulfides substituted with sulfo groups, such as bis(4-sulfophenyl)disulfide, bis(2,4,6-trisulfophenyl)disulfide, and bis(pentasulfophenyl)disulfide; diphenyl disulfides substituted with alkoxysulfonyl groups, such as bis(4-methoxysulfonylphenyl)disulfide, bis(2,4,6-trimethoxysulfonylphenyl)disulfide, and bis(pentamethoxysulfonylphenyl)disulfide; diphenyl disulfides substituted with sulfonyl halide groups, such as bis(4-chlorosulfonylphenyl)disulfide, bis(2,4,6-tri(chlorosulfonyl)phenyl)disulfide, and bis(penta(chlorosulfonyl)phenyl)disulfide; diphenyl disulfides substituted with sulfino groups, such as bis(4-sulfinophenyl)disulfide, bis(2,4,6-trisulfinophenyl)disulfide, and bis(pentasulfinophenyl)disulfide; diphenyl disulfides substituted with alkylsulfinyl groups, such as bis(4-methylsulfinylphenyl)disulfide, bis(2,4,6-tri(methylsulfinyl)phenyl)disulfide, and bis(penta(methylsulfinyl)phenyl)disulfide; diphenyl disulfides substituted with carbamoyl groups, such as bis(4-carbamoylphenyl)disulfide, bis(2,4,6-tricarbamoylphenyl)disulfide, and bis(pentacarbamoylphenyl)disulfide; diphenyl disulfides substituted with alkyl halide groups, such as bis(4-trichloromethylphenyl)disulfide, bis(2,4,6-tri(trichloromethyl)phenyl)disulfide, and bis(penta(trichloromethyl)phenyl)disulfide; diphenyl disulfides substituted with cyano groups, such as bis(4-cyanophenyl)disulfide, bis(2,4,6-tricyanophenyl)disulfide, and bis(pentacyanophenyl)disulfide; and diphenyl disulfides substituted with alkoxy groups, such as bis(4-methoxyphenyl)disulfide, bis(2,4,6-trimethoxyphenyl)disulfide, and bis(pentamethoxyphenyl)disulfide. Each of these diphenyl disulfides is substituted with one type of substituent.

Another example of the organic sulfur compound represented by the chemical formula (2) is a compound substituted with at least one type of the above substituents and another substituent. Examples of the other substituent include a nitro group ($-NO_2$), an amino group ($-NH_2$), a hydroxyl group ($-OH$), and a phenylthio group ($-SPh$). Specific examples of the compound include bis(4-chloro-2-nitrophenyl)disulfide, bis(4-chloro-2-aminophenyl)disulfide, bis(4-chloro-2-hydroxyphenyl)disulfide, bis(4-chloro-2-phenylthiophenyl)disulfide, bis(4-methyl-2-nitrophenyl)disulfide, bis(4-methyl-2-aminophenyl)disulfide, bis(4-methyl-2-hydroxyphenyl)disulfide, bis(4-methyl-2-phenylthiophenyl)disulfide, bis(4-carboxy-2-nitrophenyl)disulfide, bis(4-carboxy-2-aminophenyl)disulfide, bis(4-carboxy-2-hydroxyphenyl)disulfide, bis(4-carboxy-2-phenylthiophenyl)disulfide, bis(4-methoxycarbonyl-2-nitrophenyl)disulfide, bis(4-methoxycarbonyl-2-aminophenyl)disulfide, bis(4-methoxycarbonyl-2-hydroxyphenyl)disulfide, bis(4-methoxycarbonyl-2-phenylthiophenyl)disulfide, bis(4-formyl-2-nitrophenyl)disulfide, bis(4-formyl-2-aminophenyl)disulfide, bis(4-formyl-2-hydroxyphenyl)disulfide, bis(4-formyl-2-phenylthiophenyl)disulfide, bis(4-acetyl-2-nitrophenyl)disulfide, bis(4-acetyl-2-aminophenyl)disulfide, bis(4-acetyl-2-hydroxyphenyl)disulfide, bis(4-acetyl-2-phenylthiophenyl)disulfide, bis(4-chlorocarbonyl-2-nitrophenyl)disulfide, bis(4-chlorocarbonyl-2-aminophenyl)disulfide, bis(4-chlorocarbonyl-2-hydroxyphenyl)disulfide, bis(4-chlorocarbonyl-2-phenylthiophenyl)disulfide, bis(4-sulfo-2-nitrophenyl)disulfide, bis(4-sulfo-2-aminophenyl)disulfide, bis(4-sulfo-2-hydroxyphenyl)disulfide, bis(4-sulfo-2-phenylthiophenyl)disulfide, bis(4-methoxysulfonyl-2-nitrophenyl)disulfide, bis(4-methoxysulfonyl-2-aminophenyl)disulfide, bis(4-methoxysulfonyl-2-hydroxyphenyl)disulfide, bis(4-methoxysulfonyl-2-phenylthiophenyl)disulfide, bis(4-chlorosulfonyl-2-nitrophenyl)disulfide, bis(4-chlorosulfonyl-2-aminophenyl)disulfide, bis(4-chlorosulfonyl-2-hydroxyphenyl)disulfide, bis(4-chlorosulfonyl-2-phenylthiophenyl)disulfide, bis(4-sulfino-2-nitrophenyl)disulfide, bis(4-sulfino-2-aminophenyl)disulfide, bis(4-sulfino-2-hydroxyphenyl)disulfide, bis(4-sulfino-2-phenylthiophenyl)disulfide, bis(4-methylsulfinyl-2-nitrophenyl)disulfide, bis(4-methylsulfinyl-2-aminophenyl)disulfide, bis(4-methylsulfinyl-2-hydroxyphenyl)disulfide, bis(4-methylsulfinyl-2-phenylthiophenyl)disulfide, bis(4-carbamoyl-2-nitrophenyl)disulfide, bis(4-carbamoyl-2-aminophenyl)disulfide, bis(4-carbamoyl-2-hydroxyphenyl)disulfide, bis(4-carbamoyl-2-phenylthiophenyl)disulfide, bis(4-trichloromethyl-2-nitrophenyl)disulfide, bis(4-trichloromethyl-2-aminophenyl)disulfide, bis(4-trichloromethyl-2-hydroxyphenyl)disulfide, bis(4-trichloromethyl-2-phenylthiophenyl)disulfide, bis(4-cyano-2-nitrophenyl)disulfide, bis(4-cyano-2-aminophenyl)disulfide, bis(4-cyano-2-hydroxyphenyl)disulfide, bis(4-cyano-2-phenylthiophenyl)disulfide, bis(4-methoxy-2-nitrophenyl)disulfide, bis(4-methoxy-2-aminophenyl)disulfide, bis(4-methoxy-2-hydroxyphenyl)disulfide, and bis(4-methoxy-2-phenylthiophenyl)disulfide.

Sill another example of the organic sulfur compound represented by the chemical formula (2) is a compound substituted with two or more types of substituents. Specific examples of the compound include bis(4-acetyl-2-chlorophenyl)disulfide, bis(4-acetyl-2-methylphenyl)disulfide, bis(4-acetyl-2-carboxyphenyl)disulfide, bis(4-acetyl-2-methoxycarbonylphenyl)disulfide, bis(4-acetyl-2-formylphenyl)disulfide, bis(4-acetyl-2-chlorocarbonylphenyl)disulfide, bis(4-acetyl-2-sulfophenyl)disulfide, bis(4-acetyl-2-methoxysulfonylphenyl)disulfide, bis(4-acetyl-2-chlorosulfonylphenyl)disulfide, bis(4-acetyl-2-sulfinophenyl)disulfide, bis(4-acetyl-2-methylsulfinylphenyl)disulfide, bis(4-acetyl-2-carbamoylphenyl)disulfide, bis(4-acetyl-2-trichloromethylphenyl)disulfide, bis(4-acetyl-2-cyanophenyl)disulfide, and bis(4-acetyl-2-methoxyphenyl)disulfide.

Examples of the organic sulfur compound represented by the chemical formula (3) include thiophenol sodium salt; thiophenol sodium salts substituted with halogen groups, such as 4-fluorothiophenol sodium salt, 2,5-difluorothiophenol sodium salt, 2,4,5-trifluorothiophenol sodium salt, 2,4,5,6-tetrafluorothiophenol sodium salt, pentafluorothiophenol sodium salt, 4-chlorothiophenol sodium salt, 2,5-dichlorothiophenol sodium salt, 2,4,5-trichlorothiophenol sodium salt, 2,4,5,6-tetrachlorothiophenol sodium salt, pentachlorothiophenol sodium salt, 4-bromothiophenol sodium salt, 2,5-dibromothiophenol sodium salt, 2,4,5-tribromothiophenol sodium salt, 2,4,5,6-tetrabromothiophenol sodium salt, pentabromothiophenol sodium salt, 4-iodothiophenol sodium salt, 2,5-diiodothiophenol sodium salt, 2,4,5-triiodothiophenol sodium salt, 2,4,5,6-tetraiodothiophenol sodium salt, and pentaiodothiophenol sodium salt; thiophenol sodium salts substituted with alkyl groups, such as 4-methylthiophenol sodium salt, 2,4,5-trimethylthiophenol sodium salt, pentamethylthiophenol sodium salt, 4-t-butylthiophenol sodium salt, 2,4,5-tri-t-butylthiophenol sodium salt, and penta(t-butyl)thiophenol sodium salt; thiophenol sodium salts substituted with carboxyl groups, such as 4-carboxythiophenol sodium salt, 2,4,6-tricarboxythiophenol sodium salt, and pentacarboxythiophenol sodium salt; thiophenol sodium salts substituted with alkoxycarbonyl groups, such as 4-methoxycarbonylthiophenol sodium salt, 2,4,6-trimethoxycarbonylthiophenol sodium salt, and pentamethoxycarbonylthiophenol sodium salt; thiophenol sodium salts substituted with formyl groups, such as 4-formylthiophenol sodium salt, 2,4,6-triformylthiophenol sodium salt, and pentaformylthiophenol sodium salt; thiophenol sodium salts substituted with acyl groups, such as 4-acetylthiophenol sodium salt, 2,4,6-triacetylthiophenol sodium salt, and pentaacetylthiophenol sodium salt; thiophenol sodium salts substituted with carbonyl halide groups, such as 4-chlorocarbonylthiophenol sodium salt, 2,4,6-tri(chlorocarbonyl)thiophenol sodium salt, and penta(chlorocarbonyl)thiophenol sodium salt; thiophenol sodium salts substituted with sulfo groups, such as 4-sulfothiophenol sodium salt, 2,4,6-trisulfothiophenol sodium salt, and pentasulfothiophenol sodium salt; thiophenol sodium salts substituted with alkoxysulfonyl groups, such as 4-methoxysulfonylthiophenol sodium salt, 2,4,6-trimethoxysulfonylthiophenol sodium salt, and pentamethoxysulfonylthiophenol sodium salt; thiophenol sodium salts substituted with sulfonyl halide groups, such as 4-chlorosulfonylthiophenol sodium salt, 2,4,6-tri(chlorosulfonyl)thiophenol sodium salt, and penta(chlorosulfonyl)thiophenol sodium salt; thiophenol sodium salts substituted with sulfino groups, such as 4-sulfinothiophenol sodium salt, 2,4,6-trisulfinothiophenol sodium salt, and pentasulfinothiophenol sodium salt; thiophenol sodium salts substituted with alkylsulfinyl groups, such as 4-methylsulfinylthiophenol sodium salt, 2,4,6-tri(methylsulfinyl)thiophenol sodium salt, and penta(methylsulfinyl)thiophenol sodium salt; thiophenol sodium salts substituted with carbamoyl groups, such as 4-carbamoylthiophenol sodium salt, 2,4,6-tricarbamoylthiophenol sodium salt, and pentacarbamoylthiophenol sodium salt; thiophenol sodium salts substituted with alkyl halide groups, such as 4-trichloromethylthiophenol sodium salt, 2,4,6-tri(trichloromethyl)thiophenol sodium salt, and penta(trichloromethyl)thiophenol sodium salt; thiophenol sodium salts substituted with cyano groups, such as 4-cyanothiophenol sodium salt, 2,4,6-tricyanothiophenol sodium salt, and pentacyanothiophenol sodium salt; and thiophenol sodium salts substituted with alkoxy groups, such as 4-methoxythiophenol sodium salt, 2,4,6-trimethoxythiophenol sodium salt, and pentamethoxythiophenol sodium salt. Each of these thiophenol sodium salts is substituted with one type of substituent.

Another example of the organic sulfur compound represented by the chemical formula (3) is a compound substituted with at least one type of the above substituents and another substituent. Examples of the other substituent include a nitro group ($-NO_2$), an amino group ($-NH_2$), a hydroxyl group ($-OH$), and a phenylthio group ($-SPh$). Specific examples of the compound include 4-chloro-2-nitrothiophenol sodium salt, 4-chloro-2-aminothiophenol sodium salt, 4-chloro-2-hydroxythiophenol sodium salt, 4-chloro-2-phenylthiothiophenol sodium salt, 4-methyl-2-nitrothiophenol sodium salt, 4-methyl-2-aminothiophenol sodium salt, 4-methyl-2-hydroxythiophenol sodium salt, 4-methyl-2-phenylthiothiophenol sodium salt, 4-carboxy-2-nitrothiophenol sodium salt, 4-carboxy-2-aminothiophenol sodium salt, 4-carboxy-2-hydroxythiophenol sodium salt, 4-carboxy-2-phenylthiothiophenol sodium salt, 4-methoxycarbonyl-2-nitrothiophenol sodium salt, 4-methoxycarbonyl-2-aminothiophenol sodium salt, 4-methoxycarbonyl-2-hydroxythiophenol sodium salt, 4-methoxycarbonyl-2-phenylthiothiophenol sodium salt, 4-formyl-2-nitrothiophenol sodium salt, 4-formyl-2-aminothiophenol sodium salt, 4-formyl-2-hydroxythiophenol sodium salt, 4-formyl-2-phenylthiothiophenol sodium salt, 4-acetyl-2-nitrothiophenol sodium salt, 4-acetyl-2-aminothiophenol sodium salt, 4-acetyl-2-hydroxythiophenol sodium salt, 4-acetyl-2-phenylthiothiophenol sodium salt, 4-chlorocarbonyl-2-nitrothiophenol sodium salt, 4-chlorocarbonyl-2-aminothiophenol sodium salt, 4-chlorocarbonyl-2-hydroxythiophenol sodium salt, 4-chlorocarbonyl-2-phenylthiothiophenol sodium salt, 4-sulfo-2-nitrothiophenol sodium salt, 4-sulfo-2-aminothiophenol sodium salt, 4-sulfo-2-hydroxythiophenol sodium salt, 4-sulfo-2-phenylthiothiophenol sodium salt, 4-methoxysulfonyl-2-nitrothiophenol sodium salt, 4-methoxysulfonyl-2-aminothiophenol sodium salt, 4-methoxysulfonyl-2-hydroxythiophenol sodium salt, 4-methoxysulfonyl-2-phenylthiothiophenol sodium salt, 4-chlorosulfonyl-2-nitrothiophenol sodium salt, 4-chlorosulfonyl-2-aminothiophenol sodium salt, 4-chlorosulfonyl-2-hydroxythiophenol sodium salt, 4-chlorosulfonyl-2-phenylthiothiophenol sodium salt, 4-sulfino-2-nitrothiophenol sodium salt, 4-sulfino-2-aminothiophenol sodium salt, 4-sulfino-2-hydroxythiophenol sodium salt, 4-sulfino-2-phenylthiothiophenol sodium salt, 4-methylsulfinyl-2-nitrothiophenol sodium salt, 4-methylsulfinyl-2-aminothiophenol sodium salt, 4-methylsulfinyl-2-hydroxythiophenol sodium salt, 4-methylsulfinyl-2-phenylthiothiophenol sodium salt, 4-carbamoyl-2-nitrothiophenol sodium salt, 4-carbamoyl-2-aminothiophenol sodium salt, 4-carbamoyl-2-hydroxythiophenol sodium salt, 4-carbamoyl-2-phenylthiothiophenol sodium salt, 4-trichloromethyl-2-nitrothiophenol sodium salt, 4-trichloromethyl-2-aminothiophenol sodium salt, 4-trichloromethyl-2-hydroxythiophenol sodium salt, 4-trichloromethyl-2- phenylthiothiophenol sodium salt, 4-cyano-2-nitrothiophenol sodium salt, 4-cyano-2-aminothiophenol sodium salt, 4-cyano-2-hydroxythiophenol sodium salt, 4-cyano-2-phenylthiothiophenol sodium salt, 4-methoxy-2-nitrothiophenol sodium salt, 4-methoxy-2-aminothiophenol sodium salt, 4-methoxy-2-hydroxythiophenol sodium salt, and 4-methoxy-2-phenylthiothiophenol sodium salt.

Still another example of the organic sulfur compound represented by the chemical formula (3) is a compound substituted with two or more types of substituents. Specific examples of the compound include 4-acetyl-2-chlorothiophenol sodium salt, 4-acetyl-2-methylthiophenol sodium salt, 4-acetyl-2-carboxythiophenol sodium salt, 4-acetyl-2-methoxycarbonylthiophenol sodium salt, 4-acetyl-2-formylthiophenol sodium salt, 4-acetyl-2-chlorocarbonylthiophenol sodium salt, 4-acetyl-2-sulfothiophenol sodium salt, 4-acetyl-2-methoxysulfonylthiophenol sodium salt, 4-acetyl-2-chlorosulfonylthiophenol sodium salt, 4-acetyl-2-sulfinothiophenol sodium salt, 4-acetyl-2-methylsulfinylthiophenol sodium salt, 4-acetyl-2-carbamoylthiophenol sodium salt, 4-acetyl-2-trichloromethylthiophenol sodium salt, 4-acetyl-2-cyanothiophenol sodium salt, and 4-acetyl-2-methoxythiophenol sodium salt. Examples of the monovalent metal represented by M1 in the chemical formula (3) include sodium, lithium, potassium, copper (I), and silver (I).

Examples of the organic sulfur compound represented by the chemical formula (4) include thiophenol zinc salt; thiophenol zinc salts substituted with halogen groups, such as 4-fluorothiophenol zinc salt, 2,5-difluorothiophenol zinc salt, 2,4,5-trifluorothiophenol zinc salt, 2,4,5,6-tetrafluorothiophenol zinc salt, pentafluorothiophenol zinc salt, 4-chlorothiophenol zinc salt, 2,5-dichlorothiophenol zinc salt, 2,4,5-trichlorothiophenol zinc salt, 2,4,5,6-tetrachlorothiophenol zinc salt, pentachlorothiophenol zinc salt, 4-bromothiophenol zinc salt, 2,5-dibromothiophenol zinc salt, 2,4,5-tribromothiophenol zinc salt, 2,4,5,6-tetrabromothiophenol zinc salt, pentabromothiophenol zinc salt, 4-iodothiophenol zinc salt, 2,5-diiodothiophenol zinc salt, 2,4,5-triiodothiophenol zinc salt, 2,4,5,6-tetraiodothiophenol zinc salt, and pentaiodothiophenol zinc salt; thiophenol zinc salts substituted with alkyl groups, such as 4-methylthiophenol zinc salt, 2,4,5-trimethylthiophenol zinc salt, pentamethylthiophenol zinc salt, 4-t-butylthiophenol zinc salt, 2,4,5-tri-t-butylthiophenol zinc salt, and penta-t-butylthiophenol zinc salt; thiophenol zinc salts substituted with carboxyl groups, such as 4-carboxythiophenol zinc salt, 2,4,6-tricarboxythiophenol zinc salt, and pentacarboxythiophenol zinc salt; thiophenol zinc salts substituted with alkoxycarbonyl groups, such as 4-methoxycarbonylthiophenol zinc salt, 2,4,6-trimethoxycarbonylthiophenol zinc salt, and pentamethoxycarbonylthiophenol zinc salt; thiophenol zinc salts substituted with formyl groups, such as 4-formylthiophenol zinc salt, 2,4,6-triformylthiophenol zinc salt, and pentaformylthiophenol zinc salt; thiophenol zinc salts substituted with acyl groups, such as 4-acetylthiophenol zinc salt, 2,4,6-triacetylthiophenol zinc salt, and pentaacetylthiophenol zinc salt; thiophenol zinc salts substituted with carbonyl halide groups, such as 4-chlorocarbonylthiophenol zinc salt, 2,4,6-tri(chlorocarbonyl)thiophenol zinc salt, and penta(chlorocarbonyl)thiophenol zinc salt; thiophenol zinc salts substituted with sulfo groups, such as 4-sulfothiophenol zinc salt, 2,4,6-trisulfothiophenol zinc salt, and pentasulfothiophenol zinc salt; thiophenol zinc salts substituted with alkoxysulfonyl groups, such as 4-methoxysulfonylthiophenol zinc salt, 2,4,6-trimethoxysulfonylthiophenol zinc salt, and pentamethoxysulfonylthiophenol zinc salt; thiophenol zinc salts substituted with sulfonyl halide groups, such as 4-chlorosulfonylthiophenol zinc salt, 2,4,6-tri(chlorosulfonyl)thiophenol zinc salt, and penta(chlorosulfonyl)thiophenol zinc salt; thiophenol zinc salts substituted with sulfino groups, such as 4-sulfinothiophenol zinc salt, 2,4,6-trisulfinothiophenol zinc salt, and pentasulfinothiophenol zinc salt; thiophenol zinc salts substituted with alkylsulfinyl groups, such as 4-methylsulfinylthiophenol zinc salt, 2,4,6-tri(methylsulfinyl)thiophenol zinc salt, and penta(methylsulfinyl)thiophenol zinc salt; thiophenol zinc salts substituted with carbamoyl groups, such as 4-carbamoylthiophenol zinc salt, 2,4,6-tricarbamoylthiophenol zinc salt, and pentacarbamoylthiophenol zinc salt; thiophenol zinc salts substituted with alkyl halide groups, such as 4-trichloromethylthiophenol zinc salt, 2,4,6-tri(trichloromethyl)thiophenol zinc salt, and penta(trichloromethyl)thiophenol zinc salt; thiophenol zinc salts substituted with cyano groups, such as 4-cyanothiophenol zinc salt, 2,4,6-tricyanothiophenol zinc salt, and pentacyanothiophenol zinc salt; and thiophenol zinc salts substituted with alkoxy groups, such as 4-methoxythiophenol zinc salt, 2,4,6-trimethoxythiophenol zinc salt, and pentamethoxythiophenol zinc salt. Each of these thiophenol zinc salts is substituted with one type of substituent.

Another example of the organic sulfur compound represented by the chemical formula (4) is a compound substituted with at least one type of the above substituents and another substituent. Examples of the other substituent include a nitro group (—$NO_2$), an amino group (—$NH_2$), a hydroxyl group (—OH), and a phenylthio group (—SPh). Specific examples of the compound include 4-chloro-2-nitrothiophenol zinc salt, 4-chloro-2-aminothiophenol zinc salt, 4-chloro-2-hydroxythiophenol zinc salt, 4-chloro-2-phenylthiothiophenol zinc salt, 4-methyl-2-nitrothiophenol zinc salt, 4-methyl-2-aminothiophenol zinc salt, 4-methyl-2-hydroxythiophenol zinc salt, 4-methyl-2-phenylthiothiophenol zinc salt, 4-carboxy-2-nitrothiophenol zinc salt, 4-carboxy-2-aminothiophenol zinc salt, 4-carboxy-2-hydroxythiophenol zinc salt, 4-carboxy-2-phenylthiothiophenol zinc salt, 4-methoxycarbonyl-2-nitrothiophenol zinc salt, 4-methoxycarbonyl-2-aminothiophenol zinc salt, 4-methoxycarbonyl-2-hydroxythiophenol zinc salt, 4-methoxycarbonyl-2-phenylthiothiophenol zinc salt, 4-formyl-2-nitrothiophenol zinc salt, 4-formyl-2-aminothiophenol zinc salt, 4-formyl-2-hydroxythiophenol zinc salt, 4-formyl-2-phenylthiothiophenol zinc salt, 4-acetyl-2-nitrothiophenol zinc salt, 4-acetyl-2-aminothiophenol zinc salt, 4-acetyl-2-hydroxythiophenol zinc salt, 4-acetyl-2-phenylthiothiophenol zinc salt, 4-chlorocarbonyl-2-nitrothiophenol zinc salt, 4-chlorocarbonyl-2-aminothiophenol zinc salt, 4-chlorocarbonyl-2-hydroxythiophenol zinc salt, 4-chlorocarbonyl-2-phenylthiothiophenol zinc salt, 4-sulfo-2-nitrothiophenol zinc salt, 4-sulfo-2-aminothiophenol zinc salt, 4-sulfo-2-hydroxythiophenol zinc salt, 4-sulfo-2-phenylthiothiophenol zinc salt, 4-methoxysulfonyl-2-nitrothiophenol zinc salt, 4-methoxysulfonyl-2-aminothiophenol zinc salt, 4-methoxysulfonyl-2-hydroxythiophenol zinc salt, 4-methoxysulfonyl-2-phenylthiothiophenol zinc salt, 4-chlorosulfonyl-2-nitrothiophenol zinc salt, 4-chlorosulfonyl-2-aminothiophenol zinc salt, 4-chlorosulfonyl-2-hydroxythiophenol zinc salt, 4-chlorosulfonyl-2-phenylthiothiophenol zinc salt, 4-sulfino-2-nitrothiophenol zinc salt, 4-sulfino-2-aminothiophenol zinc salt, 4-sulfino-2-hydroxythiophenol zinc salt, 4-sulfino-2-phenylthiothiophenol zinc salt, 4-methylsulfinyl-2-nitrothiophenol zinc salt, 4-methylsulfinyl-2-aminothiophenol zinc salt, 4-methylsulfinyl-2-hydroxythiophenol zinc salt, 4-methylsulfinyl-2-phenylthiothiophenol zinc salt, 4-carbamoyl-2-nitrothiophenol zinc salt, 4-carbamoyl- 2-aminothiophenol zinc salt, 4-carbamoyl-2-hydroxythiophenol zinc salt, 4-carbamoyl-2-phenylthiothiophenol zinc salt, 4-trichloromethyl-2-nitrothiophenol zinc salt, 4-trichloromethyl-2-aminothiophenol zinc salt, 4-trichloromethyl-2-hydroxythiophenol zinc salt, 4-trichloromethyl-2-phenylthiothiophenol zinc salt, 4-cyano-2-nitrothiophenol zinc salt, 4-cyano-2-aminothiophenol zinc salt, 4-cyano-2-hydroxythiophenol zinc salt, 4-cyano-2-phenylthiothiophenol zinc salt, 4-methoxy-2-nitrothiophenol zinc salt, 4-methoxy-2-aminothiophenol zinc salt, 4-methoxy-2-hydroxythiophenol zinc salt, and 4-methoxy-2-phenylthiothiophenol zinc salt.

Still another example of the organic sulfur compound represented by the chemical formula (4) is a compound substituted with two or more types of substituents. Specific examples of the compound include 4-acetyl-2-chlorothiophenol zinc salt, 4-acetyl-2-methylthiophenol zinc salt, 4-acetyl-2-carboxythiophenol zinc salt, 4-acetyl-2-methoxycarbonylthiophenol zinc salt, 4-acetyl-2-formylthiophenol zinc salt, 4-acetyl-2-chlorocarbonylthiophenol zinc salt, 4-acetyl-2-sulfothiophenol zinc salt, 4-acetyl-2-methoxysulfonylthiophenol zinc salt, 4-acetyl-2-chlorosulfonylthiophenol zinc salt, 4-acetyl-2-sulfinothiophenol zinc salt, 4-acetyl-2-methylsulfinylthiophenol zinc salt, 4-acetyl-2-carbamoylthiophenol zinc salt, 4-acetyl-2-trichloromethylthiophenol zinc salt, 4-acetyl-2-cyanothiophenol zinc salt, and 4-acetyl-2-methoxythiophenol zinc salt. Examples of the bivalent metal represented by M2 in the chemical formula (4) include zinc, magnesium, calcium, strontium, barium, titanium (II), manganese (II), iron (II), cobalt (II), nickel (II), zirconium (II), and tin (II).

Examples of naphthalenethiols include 2-naphthalenethiol, 1-naphthalenethiol, 2-chloro-1-naphthalenethiol, 2-bromo-1-naphthalenethiol, 2-fluoro-1-naphthalenethiol, 2-cyano-1-naphthalenethiol, 2-acetyl-1-naphthalenethiol, 1-chloro-2-naphthalenethiol, 1-bromo-2-naphthalenethiol, 1-fluoro-2-naphthalenethiol, 1-cyano-2-naphthalenethiol, 1-acetyl-2-naphthalenethiol, and metal salts thereof. 1-naphthalenethiol, 2-naphthalenethiol, and zinc salts thereof are preferred.

Examples of sulfenamide type organic sulfur compounds include N-cyclohexyl-2-benzothiazole sulfenamide, N-oxydiethylene-2-benzothiazole sulfenamide, and N-t-butyl-2-benzothiazole sulfenamide. Examples of thiuram type organic sulfur compounds include tetramethylthiuram monosulfide, tetramethylthiuram disulfide, tetraethylthiuram disulfide, tetrabutylthiuram disulfide, and dipentamethylenethiuram tetrasulfide. Examples of dithiocarbamates include zinc dimethyldithiocarbamate, zinc diethyldithiocarbamate, zinc dibutyldithiocarbamate, zinc ethylphenyldithiocarbamate, sodium dimethyldithiocarbamate, sodium diethyldithiocarbamate, copper (II) dimethyldithiocarbamate, iron (III) dimethyldithiocarbamate, selenium diethyldithiocarbamate, and tellurium diethyldithiocarbamate. Examples of thiazole type organic sulfur compounds include 2-mercaptobenzothiazole (MBT); dibenzothiazyl disulfide (MBTS); a sodium salt, a zinc salt, a copper salt, or a cyclohexylamine salt of 2-mercaptobenzothiazole; 2-(2,4-dinitrophenyl)mercaptobenzothiazole; and 2-(2,6-diethyl-4-morpholinothio)benzothiazole.

In light of resilience performance, the amount of the organic sulfur compound (e) is preferably equal to or greater than 0.05 parts by weight and particularly preferably equal to or greater than 0.1 parts by weight per 100 parts by weight of the base rubber. In light of resilience performance, the amount is preferably equal to or less than 5.0 parts by weight and particularly preferably equal to or less than 2.0 parts by weight per 100 parts by weight of the base rubber.

For the purpose of adjusting specific gravity and the like, a filler may be included in the core 4. Examples of suitable fillers include zinc oxide, barium sulfate, calcium carbonate, and magnesium carbonate. The amount of the filler is determined as appropriate so that the intended specific gravity of the core 4 is accomplished. A particularly preferable filler is zinc oxide. Zinc oxide serves not only as a specific gravity adjuster but also as a crosslinking activator.

According to need, an anti-aging agent, a coloring agent, a plasticizer, a dispersant, sulfur, a vulcanization accelerator, and the like are added to the rubber composition of the core 4. Crosslinked rubber powder or synthetic resin powder may also be dispersed in the rubber composition.

In the core 4, the difference (Hs−H(0)) between the surface hardness Hs and the central hardness H(0) is preferably equal to or greater than 15. The difference is great. In other words, the core 4 has an outer-hard/inner-soft structure. When the core 4 is hit with a middle iron, the recoil (torsional return) is great, and thus spin is suppressed. The core 4 contributes to the flight performance of the golf ball 2. In light of flight performance, the difference (Hs−H(0)) is more preferably equal to or greater than 20 and particularly preferably equal to or greater than 25. From the standpoint that the core 4 can easily be formed, the difference (Hs−H(0)) is preferably equal to or less than 50.

The hardness H(0) at the central point of the core 4 is preferably equal to or greater than 40.0 but equal to or less than 70.0. The golf ball 2 having a hardness H(0) of 40.0 or greater has excellent resilience performance. In this respect, the hardness H(0) is more preferably equal to or greater than 45.0 and particularly preferably equal to or greater than 50.0. The core 4 having a hardness H(0) of 70.0 or less can achieve an outer-hard/inner-soft structure. In the golf ball 2 that includes the core 4, spin can be suppressed. In this respect, the hardness H(0) is more preferably equal to or less than 68.0 and particularly preferably equal to or less than 66.0.

The hardness Hs at the surface of the core 4 is preferably equal to or greater than 78.0 but equal to or less than 95.0. The core 4 having a hardness Hs of 78.0 or greater can achieve an outer-hard/inner-soft structure. In the golf ball 2 that includes the core 4, spin can be suppressed. In this respect, the hardness Hs is more preferably equal to or greater than 80.0 and particularly preferably equal to or greater than 82.0. The golf ball 2 having a hardness Hs of 95.0 or less has excellent durability. In this respect, the hardness Hs is more preferably equal to or less than 93.0 and particularly preferably equal to or less than 90.0.

The core 4 has a diameter of preferably 38.0 mm or greater but 42.0 mm or less. The core 4 having a diameter of 38.0 mm or greater can achieve excellent resilience performance of the golf ball 2. In this respect, the diameter is more preferably equal to or greater than 38.5 mm and particularly preferably equal to or greater than 39.0 mm. In the golf ball 2 that includes the core 4 having a diameter of 42.0 mm or less, the inner cover 8 and the outer cover 10 can have sufficient thicknesses. The golf ball 2 that includes the inner cover 8 and the outer cover 10 having large thicknesses have excellent durability. In this respect, the diameter is more preferably equal to or less than 41 mm and particularly preferably equal to or less than 40 mm. The core 4 may include two or more layers.

In light of feel at impact, the core 4 has an amount of compressive deformation Dc of preferably 3.0 mm or greater and particularly preferably 3.3 mm or greater. In light of resilience performance, the amount of compressive deformation Dc is preferably equal to or less than 4.6 mm and particularly preferably equal to or less than 4.3 mm.

For the inner cover 8, a resin composition is suitably used. Examples of the base polymer of the resin composition include ionomer resins, styrene block-containing thermoplastic elastomers, thermoplastic polyester elastomers, thermoplastic polyamide elastomers, and thermoplastic polyolefin elastomers.

Particularly preferable base polymers are ionomer resins. The golf ball 2 that includes the inner cover 8 including an ionomer resin has excellent resilience performance. An ionomer resin and another resin may be used in combination for the inner cover 8. In this case, the principal component of the base polymer is preferably the ionomer resin. Specifically, the proportion of the ionomer resin to the entire base polymer is preferably equal to or greater than 50% by weight, more preferably equal to or greater than 60% by weight, and particularly preferably equal to or greater than 70% by weight.

Examples of preferable ionomer resins include binary copolymers formed with an $\alpha$-olefin and an $\alpha,\beta$-unsaturated carboxylic acid having 3 to 8 carbon atoms. A preferable binary copolymer includes 80% by weight or more but 90% by weight or less of an $\alpha$-olefin, and 10% by weight or more but 20% by weight or less of an $\alpha,\beta$-unsaturated carboxylic acid. The binary copolymer has excellent resilience performance. Examples of other preferable ionomer resins include ternary copolymers formed with: an $\alpha$-olefin; an $\alpha,\beta$-unsaturated carboxylic acid having 3 to 8 carbon atoms; and an $\alpha,\beta$-unsaturated carboxylate ester having 2 to 22 carbon atoms. A preferable ternary copolymer includes 70% by weight or more but 85% by weight or less of an $\alpha$-olefin, 5% by weight or more but 30% by weight or less of an $\alpha,\beta$-unsaturated carboxylic acid, and 1% by weight or more but 25% by weight or less of an $\alpha,\beta$-unsaturated carboxylate ester. The ternary copolymer has excellent resilience performance. For the binary copolymers and the ternary copolymers, preferable $\alpha$-olefins are ethylene and propylene, while preferable $\alpha,\beta$-unsaturated carboxylic acids are acrylic acid and methacrylic acid. A particularly preferable ionomer resin is a copolymer formed with ethylene and acrylic acid or methacrylic acid.

In the binary copolymers and the ternary copolymers, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7318", "Himilan AM7329", and "Himilan AM7337", "Himilan MK7320", and "Himilan MK7329", manufactured by Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E.I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation.

Two or more ionomer resins may be used in combination for the inner cover 8. An ionomer resin neutralized with a monovalent metal ion, and an ionomer resin neutralized with a bivalent metal ion may be used in combination.

A preferable resin that can be used in combination with an ionomer resin is a styrene block-containing thermoplastic elastomer. The styrene block-containing thermoplastic elastomer has excellent compatibility with ionomer resins. A resin composition including the styrene block-containing thermoplastic elastomer has excellent fluidity.

The styrene block-containing thermoplastic elastomer includes a polystyrene block as a hard segment, and a soft segment. A typical soft segment is a diene block. Examples of diene compounds include butadiene, isoprene, 1,3-pentadiene, and 2,3-dimethyl-1,3-butadiene. Butadiene and isoprene are preferred. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the styrene block-containing thermoplastic elastomer is preferably equal to or greater than 10% by weight, more preferably equal to or greater than 12% by weight, and particularly preferably equal to or greater than 15% by weight. In light of feel at impact of the golf ball 2, the content is preferably equal to or less than 50% by weight, more preferably equal to or less than 47% by weight, and particularly preferably equal to or less than 45% by weight.

In the present invention, styrene block-containing thermoplastic elastomers include alloys of olefin and one or more members selected from the group consisting of SBS, SIS, SIBS, SEBS, SEPS, SEEPS, and hydrogenated products thereof. The olefin component in the alloy is presumed to contribute to improvement of compatibility with ionomer resins. Use of this alloy improves the resilience performance of the golf ball 2. An olefin having 2 to 10 carbon atoms is preferably used. Examples of suitable olefins include ethylene, propylene, butene, and pentene. Ethylene and propylene are particularly preferred.

Specific examples of polymer alloys include trade names "Rabalon T3221C", "Rabalon T3339C", "Rabalon SJ4400N", "Rabalon SJ5400N", "Rabalon SJ6400N", "Rabalon SJ7400N", "Rabalon SJ8400N", "Rabalon SJ9400N", and "Rabalon SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "Septon HG-252" manufactured by Kuraray Co., Ltd.

According to need, a coloring agent such as titanium dioxide and a fluorescent pigment, a filler such as barium sulfate, a dispersant, an antioxidant, an ultraviolet absorber, a light stabilizer, a fluorescent material, a fluorescent brightener, and the like are included in the resin composition of the inner cover 8 in an adequate amount. The inner cover 8 may include powder of a metal with a high specific gravity.

From the standpoint that an outer-hard/inner-soft structure can be achieved in a sphere 16 consisting of the core 4 and the inner cover 8, the inner cover 8 has a hardness Hi of preferably 80 or greater, more preferably 83 or greater, and particularly preferably 85 or greater. In light of feel at impact of the golf ball 2, the hardness Hi is preferably equal to or less than 95 and particularly preferably equal to or less than 90. The hardness Hi is measured with a JIS-C type hardness scale mounted to an automated rubber hardness measurement machine (trade name "P1", manufactured by Kobunshi Keiki Co., Ltd.). For the measurement, a slab that is formed by hot press and that has a thickness of about 2 mm is used. A slab kept at 23° C. for two weeks is used for the measurement. At the measurement, three slabs are stacked. A slab formed from the same resin composition as the resin composition of the inner cover 8 is used.

From the standpoint that an outer-hard/inner-soft structure is achieved in the sphere 16 and spin of the golf ball 2 is suppressed, the hardness Hi of the inner cover 8 is preferably greater than the surface hardness Hs of the core 4. In light of suppression of spin, the difference (Hi−Hs) between the hardness Hi and the hardness Hs is preferably equal to or greater than 1 and particularly preferably equal to or greater than 2. The difference (Hi−Hs) is preferably equal to or less than 5. In the sphere 16 having a difference (Hi−Hs) of 5 or less, the hardness linearly increases from its central point toward its surface. In the sphere 16 whose hardness linearly increases, the energy loss is low when being hit with a middle iron.

The inner cover 8 has a thickness of preferably 0.2 mm or greater but 2.0 mm or less. In the sphere 16 that includes the inner cover 8 having a thickness of 0.2 mm or greater, an outer-hard/inner-soft structure can be achieved. In this respect, the thickness of the inner cover 8 is more preferably equal to or greater than 0.5 mm and particularly preferably equal to or greater than 0.8 mm. The golf ball 2 that includes the inner cover 8 having a thickness of 2.0 mm or less has excellent resilience performance. In this respect, the thickness is more preferably equal to or less than 1.6 mm and particularly preferably equal to or less than 1.3 mm.

In light of feel at impact, the sphere 16 consisting of the core 4 and the inner cover 8 has an amount of compressive deformation Di of preferably 3.2 mm or greater and particularly preferably 3.4 mm or greater. In light of resilience performance, the amount of compressive deformation Di is preferably equal to or less than 3.8 mm and particularly preferably equal to or less than 3.6 mm.

For forming the inner cover 8, known methods such as injection molding, compression molding, and the like can be used.

For the outer cover 10, a resin composition is suitably used. Preferable base polymers for use in the resin composition are ionomer resins. The golf ball 2 that includes the outer cover 10 including an ionomer resin has excellent resilience performance. The ionomer resins described above for the inner cover 8 can be used for the outer cover 10.

An ionomer resin and another resin may be used in combination. In this case, in light of resilience performance, the ionomer resin is included as the principal component of the base polymer. The proportion of the ionomer resin to the entire base polymer is preferably equal to or greater than 50% by weight, more preferably equal to or greater than 60% by weight, and particularly preferably equal to or greater than 70% by weight.

A preferable resin that can be used in combination with an ionomer resin is an ethylene-(meth)acrylic acid copolymer. The copolymer is obtained by a copolymerization reaction of a monomer composition that contains ethylene and (meth) acrylic acid. In the copolymer, some of the carboxyl groups are neutralized with metal ions. The copolymer includes 3% by weight or more but 25% by weight or less of a (meth) acrylic acid component. An ethylene-(meth)acrylic acid copolymer having a polar functional group is particularly preferred. A specific example of ethylene-(meth)acrylic acid copolymers is trade name "NUCREL" manufactured by Du Pont-MITSUI POLYCHEMICALS Co., Ltd.

Another preferable resin that can be used in combination with an ionomer resin is a styrene block-containing thermoplastic elastomer. The styrene block-containing thermoplastic elastomers described above for the inner cover 8 can be used for the outer cover 10.

According to need, a coloring agent such as titanium dioxide and a fluorescent pigment, a filler such as barium sulfate, a dispersant, an antioxidant, an ultraviolet absorber, a light stabilizer, a fluorescent material, a fluorescent brightener, and the like are included in the outer cover 10 in an adequate amount.

The outer cover 10 has a JIS-C hardness Ho of preferably 83 or greater but 96 or less. The golf ball 2 that includes the outer cover 10 having a hardness Ho of 83 or greater can achieve an outer-hard/inner-soft structure. In the golf ball 2 having the outer-hard/inner-soft structure, spin is suppressed. The golf ball 2 has excellent flight performance. In this respect, the hardness Ho is more preferably equal to or greater than 84 and particularly preferably equal to or greater than 85. The golf ball 2 that includes the outer cover 10 having a hardness Ho of 96 or less has excellent feel at impact. In this respect, the hardness Ho is more preferably equal to or less than 95 and particularly preferably equal to or less than 93. The hardness Ho is measured by the same measurement method as that for the hardness Hi.

The outer cover 10 has a thickness of preferably 0.2 mm or greater but 1.5 mm or less. The outer cover 10 having a thickness of 0.2 mm or greater can easily be formed. In this respect, the thickness is more preferably equal to or greater than 0.4 mm and particularly preferably equal to or greater than 0.6 mm. In the golf ball 2 that includes the outer cover 10 having a thickness of 1.5 mm or less, spin is suppressed. In this respect, the thickness is more preferably equal to or less than 1.3 mm and particularly preferably equal to or less than 1.1 mm.

For forming the outer cover 10, known methods such as injection molding, compression molding, and the like can be used. When forming the outer cover 10, the dimples 12 are formed by pimples formed on the cavity face of a mold.

The cover 6 has a total thickness of preferably 2.5 mm or less. The golf ball 2 that includes the cover 6 having a total thickness of 2.5 mm or less has excellent feel at impact. In this respect, the total thickness is more preferably equal to or less than 2.3 mm and particularly preferably equal to or less than 2.1 mm. In light of durability of the golf ball 2, the total thickness is preferably equal to or greater than 0.3 mm, more preferably equal to or greater than 0.5 mm, and particularly preferably equal to or greater than 0.8 mm.

The outer cover 10 has a Shore D hardness Ho greater than a Shore D hardness Hi of the inner cover 8. The outer cover 10 can achieve an outer-hard/inner-soft structure of the golf ball 2. The golf ball 2 has excellent flight performance and feel at impact. The difference (Ho−Hi) is preferably equal to or greater than 2, more preferably equal to or greater than 4, and particularly preferably equal to or greater than 6. In light of suppression of energy loss when being hit, the difference (Ho−Hi) is preferably equal to or less than 10.

In a hardness distribution curve of the golf ball 2 from the central point of the core 4 to the outer cover 10, the hardness of the outer cover 10 is the greatest. In the golf ball 2, spin is suppressed.

In light of feel at impact, the golf ball 2 has an amount of compressive deformation Db of preferably 2.8 mm or greater, more preferably 2.9 mm or greater, and particularly preferably 3.0 mm or greater. In light of resilience performance, the amount of compressive deformation Db is preferably equal to or less than 3.6 mm, more preferably equal to or less than 3.5 mm, and particularly preferably equal to or less than 3.4 mm.

At measurement of the amount of compressive deformation, first, a sphere such as the core 4, the golf ball 2, or the like is placed on a hard plate made of metal. Next, a cylinder made of metal gradually descends toward the sphere. The sphere, squeezed between the bottom face of the cylinder and the hard plate, becomes deformed. A migration distance of the cylinder, starting from the state in which an initial load of 98 N is applied to the sphere up to the state in which a final load of 1274 N is applied thereto, is measured.

EXAMPLES

Example 1

A rubber composition was obtained by kneading 100 parts by weight of a high-cis polybutadiene (trade name "BR-730", manufactured by JSR Corporation), 26 parts by weight of zinc diacrylate (trade name "Sanceler SR", manufactured by SANSHIN CHEMICAL INDUSTRY CO., LTD.), 5 parts by weight of zinc oxide, an appropriate amount of barium sulfate, 0.2 parts by weight of 2-naphthalenethiol, 10 parts by weight of zinc stearate, and 0.75 parts by weight of dicumyl peroxide. This rubber composition was placed into a mold including upper and lower mold halves each having a hemispherical cavity, and heated at 170° C. for 25 minutes to obtain a core with a diameter of 39.1 mm. The amount of barium sulfate was adjusted such that the weight of a golf ball is 45.4 g.

A resin composition was obtained by kneading 40 parts by weight of an ionomer resin (the aforementioned "Himilan AM7337"), 40 parts by weight of another ionomer resin (the aforementioned "Himilan AM7329"), 20 parts by weight of a styrene block-containing thermoplastic elastomer (the aforementioned "Rabalon T3221C"), and 6 parts by weight of titanium dioxide with a twin-screw kneading extruder. The core was placed into a mold. The core was covered with the resin composition by injection molding to form an inner cover with a thickness of 1.0 mm.

A resin composition was obtained by kneading 5 parts by weight of an ionomer resin (the aforementioned "Himilan AM7337"), 10 parts by weight of another ionomer resin (the aforementioned "Himilan 1555"), 55 parts by weight of still another ionomer resin (the aforementioned "Himilan AM7329"), 30 parts by weight of an ethylene-(meth)acrylic acid copolymer (trade name "NUCREL N1050H", manufactured by Du Pont-MITSUI POLYCHEMICALS Co., Ltd.), 3 parts by weight of titanium dioxide, and 0.2 parts by weight of an ultraviolet absorber (trade name "TINUVIN 770", manufactured by Ciba Japan K.K.) with a twin-screw kneading extruder. The sphere consisting of the core and the inner cover was placed into a final mold having a large number of pimples on its cavity face. The sphere was covered with the resin composition by injection molding to form an outer cover with a thickness of 0.8 mm. Dimples having a shape that is the inverted shape of the pimples were formed on the outer cover. A clear paint including a two-component curing type polyurethane as a base material was applied to this outer cover to obtain a golf ball of Example 1 with a diameter of 42.7 mm.

Examples 2 to 13 and Comparative Examples 1 to 6

Golf balls of Examples 2 to 13 and Comparative Examples 1 to 6 were obtained in the same manner as Example 1, except the specifications of the core, the inner cover, and the outer cover were as shown in Tables 7 to 9 below. The composition of the core is shown in detail in Tables 1 and 2 below. The compositions of the inner cover and the outer cover are shown in detail in Table 3 below. The hardness distribution of the core is shown in Tables 4 to 6 below. The golf ball according to Comparative Example 3 does not have an inner cover.

[Hit with Middle Iron (I#5)]

A #5-iron (trade name "XXIO", manufactured by SRI Sports Limited, shaft hardness: R, loft angle: 24°) was attached to a swing machine manufactured by Golf Laboratories, Inc. A golf ball was hit under the condition of a head speed of 35 m/sec. The spin rate was measured immediately after the hit. Further, the distance from the launch point to the stop point was measured. The average value of data obtained by 12 measurements is shown in Tables 7 to 9 below.

TABLE 1

Composition of Core (parts by weight)

| | A | C | D | E | F | M |
|---|---|---|---|---|---|---|
| BR-730 | 100 | 100 | 100 | 100 | 100 | 100 |
| Sanceler SR | 27.0 | 26.0 | 27.5 | 29.5 | 31.5 | 25.0 |
| Zinc oxide | 5 | 5 | 5 | 5 | 5 | 5 |
| Barium sulfate | | | Appropriate amount | | | |
| 2-naphthalene-thiol | 0.2 | 0.2 | 0.2 | 0.2 | 0.2 | 0.2 |
| Zinc stearate | 0 | 10 | 20 | 30 | 40 | — |
| Aluminum stearate | — | — | — | — | — | 10 |
| Dicumyl peroxide | 0.75 | 0.75 | 0.75 | 0.75 | 0.75 | 0.75 |
| Deformation Dc (mm) | 3.86 | 3.85 | 3.86 | 3.85 | 3.86 | 3.83 |

TABLE 2

Composition of Core (parts by weight)

| | G | H | I | J | K | L |
|---|---|---|---|---|---|---|
| BR-730 | 100 | 100 | 100 | 100 | 100 | 100 |
| Sanceler SR | 26.5 | 25.5 | 25.0 | 25.5 | 26.0 | 25.5 |
| Zinc oxide | 5 | 5 | 5 | 5 | 5 | 5 |
| Barium sulfate | | | Appropriate amount | | | |
| 2-naphthalene-thiol | 0.2 | 0.2 | 0.2 | 0.2 | 0.2 | 0.2 |
| Zinc octoate | — | 2.5 | 5 | — | — | — |
| Zinc laurate | — | — | — | 10 | — | — |
| Zinc myristate | — | — | — | — | 5 | 10 |
| Zinc stearate | 0.5 | — | — | — | — | — |
| Dicumyl peroxide | 0.75 | 0.75 | 0.75 | 0.75 | 0.75 | 0.75 |
| Deformation Dc (mm) | 3.86 | 3.87 | 3.83 | 3.85 | 3.86 | 3.84 |

The details of the compounds listed in Tables 1 and 2 are as follows.

BR-730: a high-cis polybutadiene manufactured by JSR Corporation (cis-1,4-bond content: 96% by weight, 1,2-vinyl bond content: 1.3% by weight, Mooney viscosity ($ML_{1+4}$ (100° C.)): 55, molecular weight distribution (Mw/Mn): 3)

Sanceler SR: zinc diacrylate manufactured by SANSHIN CHEMICAL INDUSTRY CO., LTD. (a product coated with 10% by weight of stearic acid)

Zinc oxide: trade name "Ginrei R" manufactured by Toho Zinc Co., Ltd.

Barium sulfate: trade name "Barium sulfate BD" manufactured by Sakai Chemical Industry Co., Ltd.

2-naphthalenethiol: a product of Tokyo Chemical Industry Co., Ltd.

Zinc stearate: a product of Wako Pure Chemical Industries, Ltd.

Dicumyl peroxide: trade name "Percumyl D" manufactured by NOF Corporation

Zinc octoate: a product of Mitsuwa Chemicals Co., Ltd.

Zinc laurate: a product of Mitsuwa Chemicals Co., Ltd.

Zinc myristate: a product of NOF Corporation

TABLE 3

Composition of Cover (parts by weight)

|  | C1 | M1 | M2 | M3 | M4 | M5 |
|---|---|---|---|---|---|---|
| Himilan AM7337 | 5 | 51 | 45 | 40 | 24 | 26 |
| Himilan 1555 | 10 | — | — | — | — | — |
| Himilan AM7329 | 55 | 40 | 40 | 40 | 50 | 40 |
| NUCREL N1050H | 30 | — | — | — | — | — |
| Rabalon T3221C | — | 9 | 15 | 20 | 26 | 34 |
| Titanium dioxide (A220) | 3 | 6 | 6 | 6 | 6 | 6 |
| TINUVIN 770 | 0.2 | — | — | — | — | — |
| Hardness (JIS C) | 92 | 89 | 87 | 85 | 83 | 76 |

TABLE 4

Hardness Distribution of Core

|  | Comp. Ex. 1 | Comp. Ex. 2 | Ex. 1 | Ex. 2 | Ex. 3 | Comp. Ex. 3 | Ex. 13 |
|---|---|---|---|---|---|---|---|
| Composition of core | C | C | C | C | C | C | M |
| H(0) | 54.0 | 54.0 | 54.0 | 54.0 | 54.0 | 54.0 | 55.6 |
| H(2.5) | 59.8 | 59.8 | 59.8 | 59.8 | 59.8 | 59.8 | 60.2 |
| H(5.0) | 63.0 | 63.0 | 63.0 | 63.0 | 63.0 | 63.0 | 63.9 |
| H(7.5) | 64.6 | 64.6 | 64.6 | 64.6 | 64.6 | 64.6 | 65.4 |
| H(10.0) | 67.0 | 67.0 | 67.0 | 67.0 | 67.0 | 67.0 | 67.1 |
| H(12.5) | 71.8 | 71.8 | 71.8 | 71.8 | 71.8 | 71.8 | 70.9 |
| H(15.0) | 76.0 | 76.0 | 76.0 | 76.0 | 76.0 | 76.0 | 74.8 |
| H(17.5) | 79.5 | 79.5 | 79.5 | 79.5 | 79.5 | 79.5 | 77.7 |
| Hs | 83.0 | 83.0 | 83.0 | 83.0 | 83.0 | 83.0 | 82.3 |

TABLE 5

Hardness Distribution of Core

|  | Ex. 4 | Ex. 5 | Ex. 6 | Ex. 7 | Comp. Ex. 4 | Comp. Ex. 5 |
|---|---|---|---|---|---|---|
| Composition of core | C | C | D | E | F | A |
| H(0) | 54.0 | 54.0 | 56.5 | 59.2 | 61.9 | 59.0 |
| H(2.5) | 59.8 | 59.8 | 59.7 | 61.5 | 63.2 | 64.5 |
| H(5.0) | 63.0 | 63.0 | 62.0 | 63.2 | 64.3 | 67.1 |
| H(7.5) | 64.6 | 64.6 | 62.8 | 64.0 | 64.3 | 67.7 |
| H(10.0) | 67.0 | 67.0 | 66.6 | 66.8 | 67.0 | 68.6 |
| H(12.5) | 71.8 | 71.8 | 73.7 | 71.0 | 70.4 | 70.6 |
| H(15.0) | 76.0 | 76.0 | 75.4 | 72.1 | 70.5 | 74.1 |
| H(17.5) | 79.5 | 79.5 | 78.2 | 73.0 | 68.5 | 79.0 |
| Hs | 82.5 | 82.1 | 81.6 | 79.1 | 70.7 | 83.0 |

TABLE 6

Hardness Distribution of Core

|  | Ex. 8 | Ex. 9 | Ex. 10 | Ex. 11 | Ex. 12 | Comp. Ex. 6 |
|---|---|---|---|---|---|---|
| Composition of core | H | I | J | K | L | G |
| H(0) | 53.6 | 51.4 | 54.2 | 54.9 | 53.3 | 57.5 |
| H(2.5) | 58.3 | 57.6 | 58.2 | 59.0 | 58.4 | 63.5 |
| H(5.0) | 61.7 | 61.2 | 62.1 | 63.6 | 62.6 | 66.6 |
| H(7.5) | 65.2 | 63.8 | 64.4 | 67.0 | 65.5 | 68.8 |
| H(10.0) | 67.4 | 67.9 | 66.4 | 68.5 | 67.4 | 70.0 |
| H(12.5) | 71.0 | 73.8 | 71.0 | 70.1 | 71.8 | 71.2 |
| H(15.0) | 75.3 | 77.8 | 77.0 | 76.7 | 77.5 | 74.8 |
| H(17.5) | 80.6 | 82.0 | 80.7 | 80.5 | 81.3 | 78.8 |
| Hs | 84.1 | 84.9 | 83.3 | 83.4 | 84.5 | 82.9 |

TABLE 7

Result of Evaluation

|  | Co. Ex. 1 | Co. Ex. 2 | Ex. 1 | Ex. 2 | Ex. 3 | Co. Ex. 3 | Ex. 13 |
|---|---|---|---|---|---|---|---|
| Core | | | | | | | |
| Composition | C | C | C | C | C | C | M |
| Diameter (mm) | 39.1 | 39.1 | 39.1 | 39.1 | 39.1 | 39.1 | 39.1 |
| Hs − H(0) | 29.0 | 29.0 | 29.0 | 29.0 | 29.0 | 29.0 | 26.7 |
| Dc (mm) | 3.85 | 3.85 | 3.85 | 3.85 | 3.85 | 3.85 | 3.83 |
| Inner cover | | | | | | | |
| Composition | M5 | M4 | M3 | M2 | M1 | — | M2 |
| Thickness (mm) | 1.0 | 1.0 | 1.0 | 1.0 | 1.0 | — | 1.0 |

TABLE 7-continued

Result of Evaluation

|  | Co. Ex. 1 | Co. Ex. 2 | Ex. 1 | Ex. 2 | Ex. 3 | Co. Ex. 3 | Ex. 13 |
|---|---|---|---|---|---|---|---|
| Hi (JIS C) | 76.0 | 83.0 | 85.0 | 87.0 | 89.0 | — | 87.0 |
| Di (mm) | 3.57 | 3.55 | 3.55 | 3.55 | 3.55 | — | 3.53 |
| Outer cover |  |  |  |  |  |  |  |
| Composition | C1 | C1 | C1 | C1 | C1 | C1 | C1 |
| Thickness (mm) | 0.8 | 0.8 | 0.8 | 0.8 | 0.8 | 1.8 | 0.8 |
| Ho (JIS C) | 92.0 | 92.0 | 92.0 | 92.0 | 92.0 | 92.0 | 92.0 |
| Db (mm) | 3.22 | 3.20 | 3.20 | 3.20 | 3.20 | 3.25 | 3.18 |
| Cover total thickness (mm) | 1.8 | 1.8 | 1.8 | 1.8 | 1.8 | 1.8 | 1.8 |
| Hi – Hs | −7.0 | 0.0 | 2.0 | 4.0 | 6.0 | — | 4.7 |
| Ho – Hi | 16.0 | 9.0 | 7.0 | 5.0 | 3.0 | — | 5.0 |
| Spin (rpm) | 3850 | 3820 | 3790 | 3770 | 3750 | 3830 | 3785 |
| Difference from Co. Ex. 5 | −50 | −80 | −110 | −130 | −150 | −70 | −115 |
| Flight distance (m) | 150.2 | 150.4 | 151.4 | 151.6 | 151.8 | 150.3 | 151.2 |
| Difference from Co. Ex. 5 | 0.2 | 0.4 | 1.4 | 1.6 | 1.8 | 0.3 | 1.2 |

TABLE 8

Result of Evaluation

|  | Ex. 4 | Ex. 5 | Ex. 6 | Ex. 7 | Co. Ex. 4 | Co. Ex. 5 |
|---|---|---|---|---|---|---|
| Core |  |  |  |  |  |  |
| Composition | C | C | D | E | F | A |
| Diameter (mm) | 38.5 | 37.9 | 39.1 | 39.1 | 39.1 | 39.1 |
| Hs – H(0) | 28.5 | 28.1 | 25.1 | 19.9 | 8.8 | 24.0 |
| Dc (mm) | 3.85 | 3.85 | 3.86 | 3.85 | 3.86 | 3.86 |
| Inner cover |  |  |  |  |  |  |
| Composition | M3 | M3 | M3 | M3 | M3 | M3 |
| Thickness (mm) | 1.0 | 1.0 | 1.0 | 1.0 | 1.0 | 1.0 |
| Hi (JIS C) | 85.0 | 85.0 | 85.0 | 85.0 | 85.0 | 85.0 |
| Di (mm) | 3.55 | 3.55 | 3.56 | 3.60 | 3.66 | 3.56 |
| Outer cover |  |  |  |  |  |  |
| Composition | C1 | C1 | C1 | C1 | C1 | C1 |
| Thickness (mm) | 1.1 | 1.4 | 0.8 | 0.8 | 0.8 | 0.8 |
| Ho (JIS C) | 92.0 | 92.0 | 92.0 | 92.0 | 92.0 | 92.0 |
| Db (mm) | 3.18 | 3.16 | 3.21 | 3.25 | 3.31 | 3.21 |
| Cover total thickness (mm) | 2.1 | 2.4 | 1.8 | 1.8 | 1.8 | 1.8 |
| Hi – Hs | 1.5 | 2.9 | 3.4 | 5.9 | 14.3 | 2.0 |
| Ho – Hi | 7.0 | 7.0 | 7.0 | 7.0 | 7.0 | 7.0 |
| Spin (rpm) | 3795 | 3775 | 3780 | 3800 | 4000 | 3900 |
| Difference from Co. Ex. 5 | −105 | −125 | −120 | −100 | 100 | — |
| Flight distance (m) | 151.1 | 151.3 | 151.2 | 151.0 | 149.4 | 150.0 |
| Difference from Co. Ex. 5 | 1.1 | 1.3 | 1.2 | 1.0 | −0.6 | — |

TABLE 9

Result of Evaluation

|  | Ex. 8 | Ex. 9 | Ex. 10 | Ex. 11 | Ex. 12 | Co. Ex. 6 |
|---|---|---|---|---|---|---|
| Core |  |  |  |  |  |  |
| Composition | H | I | J | K | L | G |
| Diameter (mm) | 39.1 | 39.1 | 39.1 | 39.1 | 39.1 | 39.1 |
| Hs – H(0) | 30.5 | 33.5 | 29.1 | 28.5 | 31.2 | 25.4 |
| Dc (mm) | 3.87 | 3.83 | 3.85 | 3.86 | 3.84 | 3.86 |
| Inner cover |  |  |  |  |  |  |
| Composition | M1 | M1 | M1 | M1 | M1 | M1 |
| Thickness (mm) | 1.0 | 1.0 | 1.0 | 1.0 | 1.0 | 1.0 |
| Hi (JIS C) | 89.0 | 89.0 | 89.0 | 89.0 | 89.0 | 89.0 |
| Di (mm) | 3.57 | 3.53 | 3.55 | 3.56 | 3.54 | 3.56 |
| Outer cover |  |  |  |  |  |  |
| Composition | C1 | C1 | C1 | C1 | C1 | C1 |
| Thickness (mm) | 0.8 | 0.8 | 0.8 | 0.8 | 0.8 | 0.8 |
| Ho (JIS C) | 92.0 | 92.0 | 92.0 | 92.0 | 92.0 | 92.0 |
| Db (mm) | 3.22 | 3.18 | 3.20 | 3.21 | 3.19 | 3.21 |
| Cover total thickness (mm) | 1.8 | 1.8 | 1.8 | 1.8 | 1.8 | 1.8 |
| Hi – Hs | 4.9 | 4.1 | 5.7 | 5.6 | 4.5 | 6.1 |
| Ho – Hi | 3.0 | 3.0 | 3.0 | 3.0 | 3.0 | 3.0 |
| Spin (rpm) | 3735 | 3710 | 3745 | 3765 | 3740 | 3850 |
| Difference from Co. Ex. 5 | −165 | −190 | −155 | −135 | −160 | −50 |
| Flight distance (m) | 151.9 | 152.2 | 151.7 | 151.5 | 152.0 | 150.5 |
| Difference from Co. Ex. 5 | 1.9 | 2.2 | 1.7 | 1.5 | 2.0 | 0.5 |

As shown in Tables 7 to 9, the golf balls according to Examples have excellent flight performance upon a shot with a middle iron. From the results of evaluation, advantages of the present invention are clear.

The golf ball according to the present invention can be used for playing golf on golf courses and practicing at driving ranges. The above descriptions are merely for illustrative examples, and various modifications can be made without departing from the principles of the present invention.

What is claimed is:

1. A golf ball comprising a spherical core and a cover which covers the core and has two or more layers, wherein the core is formed from a crosslinked rubber composition that includes:
(a) base rubber;
(b) a co-crosslinking agent;
(c) a crosslinking initiator; and
(d) a carboxylate having a carboxylic acid component that includes 4 to 14 carbon atoms, wherein the co-crosslinking agent (b) is:
(b1) an α,β-unsaturated carboxylic acid having 3 to 8 carbon atoms; and/or
(b2) a metal salt of an α,β-unsaturated carboxylic acid having 3 to 8 carbon atoms,
the carboxylate (d) is present in an amount that is equal to or greater than 1 parts by weight but less than 10 parts by weight per 100 parts by weight of the base rubber (a),
the carboxylate carboxylic acid component excludes the α,β-unsaturated carboxylic acid,
a JIS-C hardness Hi of an innermost layer of the cover is greater than a JIS-C hardness Hs at a surface of the core,
the core has a hardness distribution such that if JIS-C hardness values are measured at eight points in the core, including the core central point, at intervals of 2.5 mm, as well as the core surface, and the hardness values are plotted versus distance in a graph, then $R^2$ of a linear approximation curve obtained by the least-square method is equal to or greater than 0.95;
the JIS-C hardness Hs at the surface of the core is equal to or greater than 78.0 but equal to or less than 95.0;
the core central point JIS-C hardness H(0) is equal to or greater than 40.0 but equal to or less than 70.0; and
the JIS-C hardness Hs at the surface of the core is greater than the core central point JIS-C hardness H(0) by a difference of equal to or greater than 15.

2. The golf ball according to claim 1, wherein the JIS-C hardness Hi of the innermost layer of the cover is equal to or greater than 80.0 but equal to or less than 95.0.

3. The golf ball according to claim 1, wherein the rubber composition further includes an organic sulfur compound (e).

4. The golf ball according to claim 1, wherein the rubber composition includes the α,β-unsaturated carboxylic acid (b1), and the rubber composition further includes a metal compound (f).

5. The golf ball according to claim 1, wherein the carboxylate (d) is a fatty acid salt.

6. The golf ball according to claim 5, wherein the carboxylate (d) is a salt of a saturated fatty acid.

7. The golf ball according to claim 1, wherein the rubber composition includes the metal salt (b2) of the α,β-unsaturated carboxylic acid.

8. The golf ball according to claim 3, wherein the organic sulfur compound (e) is a thiophenol, a polysulfide having 2 to 4 sulfur atoms, a thionaphthol, a thiuram, or a metal salt thereof.

9. The golf ball according to claim 1, wherein the rubber composition includes 15 parts by weight or greater but 50 parts by weight or less of the co-crosslinking agent (b) per 100 parts by weight of the base rubber (a).

10. The golf ball according to claim 1, wherein the rubber composition includes 0.2 parts by weight or greater but 5.0 parts by weight or less of the crosslinking initiator (c) per 100 parts by weight of the base rubber (a).

11. The golf ball according to claim 3, wherein the rubber composition includes 0.05 parts by weight or greater but 5 parts by weight or less of the organic sulfur compound (e) per 100 parts by weight of the base rubber (a).

12. The golf ball according to claim 1, wherein a difference (Hi–Hs) between the JIS-C hardness Hi of the innermost layer of the cover and the hardness Hs at the surface of the core is equal to or greater than 1 but equal to or less than 5.

13. The golf ball according to claim 1, wherein a difference (Ho–Hi) between a JIS-C hardness Ho of an outermost layer of the cover and the JIS-C hardness Hi of the innermost layer of the cover is equal to or greater than 2 but equal to or less than 10.

14. The golf ball according to claim 1, wherein, in a hardness distribution curve from a central point of the core to an outermost layer of the cover, a hardness of the outermost layer is the greatest.

15. The golf ball according to claim 1, wherein a total thickness of the cover is equal to or less than 2.5 mm.

* * * * *